United States Patent
Slegelis et al.

(10) Patent No.: US 9,693,504 B2
(45) Date of Patent: Jul. 4, 2017

(54) MOWER UTILITY BED

(71) Applicant: Briggs & Stratton Corporation, Wauwatosa, WI (US)

(72) Inventors: Eric R. Slegelis, Port Washington, WI (US); Travis Rasch, Hutisford, WI (US); Steven J. Weber, Germantown, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 15/009,672

(22) Filed: Jan. 28, 2016

(65) Prior Publication Data

US 2016/0212934 A1 Jul. 28, 2016

Related U.S. Application Data

(60) Provisional application No. 62/108,536, filed on Jan. 28, 2015.

(51) Int. Cl.
| | | |
|---|---|---|
| *B62D 33/00* | (2006.01) | |
| *A01D 75/00* | (2006.01) | |
| *A01D 34/64* | (2006.01) | |

(52) U.S. Cl.
CPC .......... *A01D 75/008* (2013.01); *A01D 34/64* (2013.01)

(58) Field of Classification Search
CPC .. A01D 2101/00; A01D 34/005; A01D 34/63; A01D 34/62; A01D 43/077; H01L 2924/00014; H01L 2924/00; H01L 2224/45144; H01L 2224/05599

USPC .............. 296/183.1; 56/12.8, 17.4, 17.5, 249
See application file for complete search history.

(56) References Cited

U.S. PATENT DOCUMENTS

| | | | | |
|---|---|---|---|---|
| 4,158,279 A | * | 6/1979 | Jackson ................. | A01D 43/07 56/16.6 |
| 4,738,327 A | * | 4/1988 | Takei ..................... | B60K 11/04 180/53.7 |
| 5,138,825 A | * | 8/1992 | Trefz ..................... | A01D 34/64 56/11.1 |
| 5,199,521 A | * | 4/1993 | Samejima ................ | F01P 11/12 180/68.1 |
| 5,210,998 A | * | 5/1993 | Hojo ..................... | A01D 34/005 56/255 |
| 5,911,672 A | * | 6/1999 | Schaedler ............. | A01D 34/64 56/10.9 |
| 6,105,349 A | * | 8/2000 | Busboom ................. | F01P 11/12 180/68.6 |
| 6,854,252 B2 | * | 2/2005 | Foster ................... | A01D 75/20 56/320.1 |
| 7,320,299 B2 | * | 1/2008 | Eavenson, Sr. ........ | F01N 13/082 123/41.49 |
| 7,527,298 B2 | * | 5/2009 | Tsuchihashi .......... | A01D 34/82 180/68.6 |
| D709,809 S | | 7/2014 | Clark | |
| 2004/0231907 A1 | * | 11/2004 | Ishii ..................... | B62D 11/183 180/307 |

(Continued)

OTHER PUBLICATIONS

RZT-S Zero brochure; Cub Cadet 2013.

(Continued)

*Primary Examiner* — Kiran B Patel
(74) *Attorney, Agent, or Firm* — Rathe Lindenbaum LLP

(57) ABSTRACT

A mower comprises a utility bed that extends at least partially over an air intake screen of an engine.

23 Claims, 20 Drawing Sheets

(56) References Cited

U.S. PATENT DOCUMENTS

| | | | | |
|---|---|---|---|---|
| 2005/0144923 | A1* | 7/2005 | Melone | A01D 34/64 56/14.7 |
| 2011/0240393 | A1* | 10/2011 | Hurd | B60K 5/00 180/233 |
| 2014/0165524 | A1* | 6/2014 | Schygge | B60L 8/003 56/10.7 |
| 2014/0167398 | A1* | 6/2014 | Burns | A01D 34/64 280/775 |
| 2016/0194989 | A1* | 7/2016 | Minoura | B60K 11/04 56/16.7 |

OTHER PUBLICATIONS www.badboymowers.com/images/mowers/options Jan. 27, 2015.
Photo of Toro-Zero Turn Mower Jan. 27, 2015.
Photo of Exmark Mower Jan. 27, 2015.
Raven America Raven MPV 7100 brochure (2014), www.ravenamerica.com/product/7100-2.

\* cited by examiner

MOWER UTILITY BED

CROSS REFERENCE TO RELATED APPLICATIONS

The present application claims priority under 35 USC 119 from co-pending U.S. provisional patent application Ser. No. 62/108,536 filed on Jan. 28, 2015 by Erik R. Slegelis et al. and entitled MOWER UTILITY BED, the full disclosure of which is hereby incorporated by reference.

BACKGROUND

Many mowers are utilized for functions other than simply mowing grass. Some mowers are equipped to additionally move a blade for moving snow. Some mowers include a carrier or bucket for hauling materials.

SUMMARY OF THE EXAMPLES

One example provides a mower. The mower includes a frame, an engine and a utility bed. The engine is supported by the frame and has an upwardly facing cooling air intake through which air is drawn to cool the engine. The utility bed extends at least partially over the air intake and has an imperforate floor.

Another example provides a utility bed for a mower having an engine supported by a frame and having an upwardly facing air intake through which air is drawn to cool the engine. The utility bed includes an imperforate floor and a mounting portion. The mounting portion extends from the floor to mount the bed to the frame with the imperforate floor extending directly above at least portion of the air intake.

Another example provides a mower. The mower includes a frame, an engine, a utility bed and a plenum. The engine is supported by the frame and has an upwardly facing air intake through which air is drawn to cool the engine. The utility bed extends at least partially over the air intake. The plenum has a top about the air intake and a skirt extending downward from the top. The plenum extends from the utility bed and restricts the flow of heated air from the engine from entering the air drawn through the air intake to cool the engine.

Another example provides a zero turn mower. The zero turn mower includes a frame, a pair of front wheels, a pair of rear wheels, a seat, a cutter deck assembly, a utility bed and an air intake through which air is drawn to cool the engine. The frame has a front portion, a rear portion and opposing side portions. The pair of front wheels are located near the front portion of the frame. The pair of rear wheels are located near the rear portion of the frame, wherein the engine is supported by the frame in between the pair of rear wheels near the rear portion of the frame. The seat is supported by the frame. The cutter deck assembly has at least one cutting blade to cut grass, wherein the cutter deck assembly is located between the pair of front wheels and the pair of rear wheels. The utility bed is supported by the frame and has an imperforate floor.

DETAILED DESCRIPTION OF EXAMPLES

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
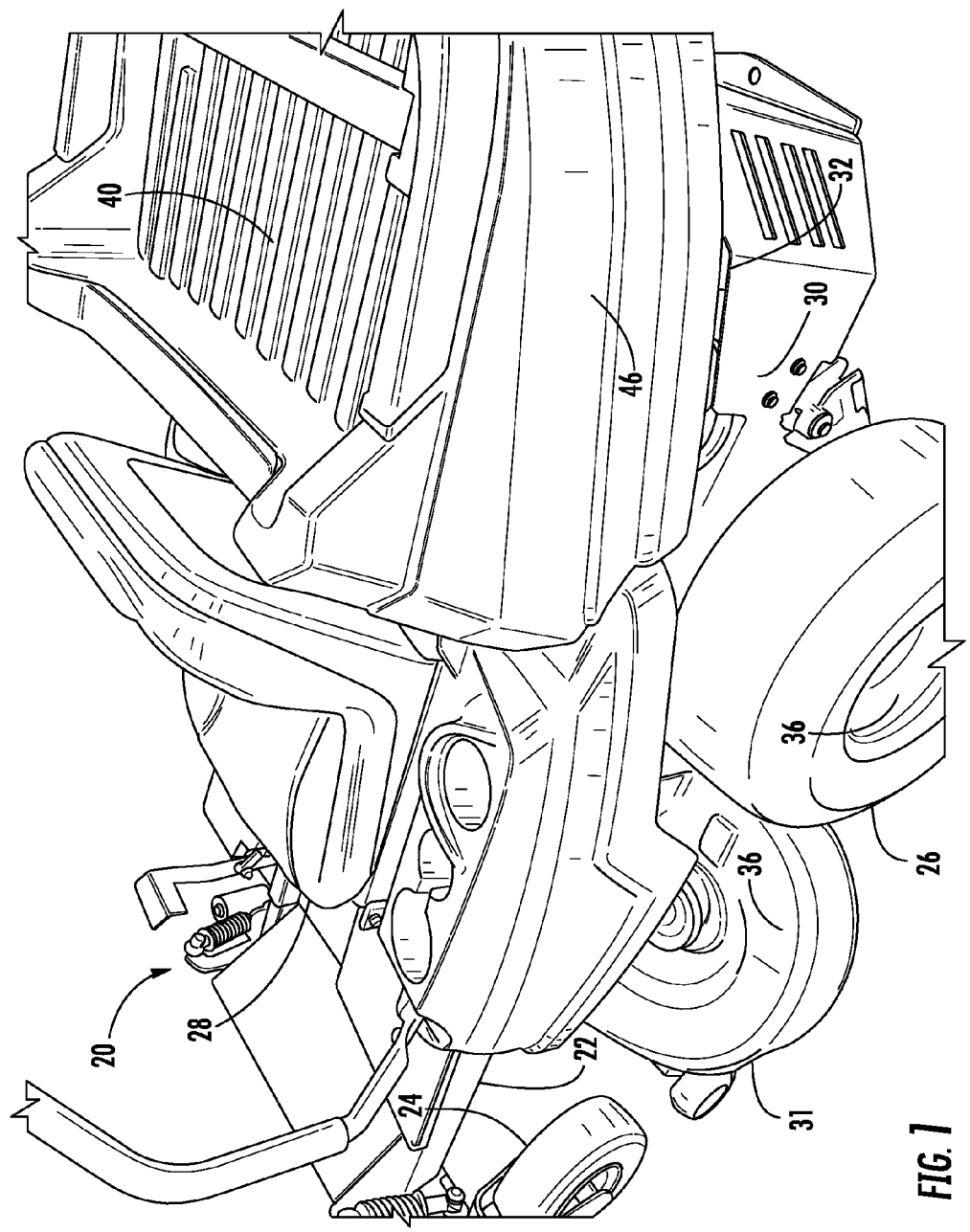
FIG. 1 is a fragmentary perspective view of an example mower.

FIG. 1 illustrates an example mower 20 configured to haul or transport materials and the like. In the example illustrated, mower 20 comprises a zero turn radius mower. The zero turn radius mower has a cutter deck assembly located between the front and rear wheels. In the example illustrated, mower 20 comprises an engine 30 rearward of a seat 28 of the mower 20. Mower 20 comprises frame 22 having a front portion 10, a rear portion 12 and opposing side portions 14, a pair of front wheels 24, a pair of rear wheels 26, seat 28, engine 30, cutting deck assembly 31, utility bed 32 and plenum 34 (shown in FIG. 8). Frame 22 comprises a base structure or platform formed for one or more components. Frame 22 is movably supported by front wheels 24 and rear wheels 26. Frame 22 supports seat 28, engine 30, mower deck assembly 31 and utility bed 32. In other implementations, the mower may be a rear engine rider or a mid-engine rider. In other implementations, the mower may have either a horizontal or vertical engine configuration or may be electric or battery powered.

Front wheels 24 and rear wheels 26 support frame 22 above the underlying terrain. In the example illustrated, wheels 24 are passive, not driven under power. In one implementation, wheels 24 comprise caster wheels, being able to swivel with respect to frame 22 about a vertical axis to accommodate turning and rotating of mower 20. In yet other implementations, wheels 24 are not passive, but are actively controlled or steered by an operator. Wheels 26 are located at a rear of mower 20. In the example illustrated, wheels 26 are rotatable about a single horizontal rotational axis 36. Wheels 26 are driven under power by engine 30 in both forwardly and reverse directions and may move vertically independently of each other. For example, one of the rear wheels may move vertically upwards in response to the terrain and the other rear wheel may respond to the terrain differently with more or less vertical movement.

Seat 28 comprises a seat upon which an operator of mower 20 may be seated. Seat 28 faces in a forward direction in front of engine 30 and bed 32. In the example illustrated, seat 28 is pivotable in a forward direction towards a front of mower 20. In other implementations, the seat 28 may be pivotable in other directions or may be removed from the mower 20 by disengaging a type of fastener or clips to remove the seat 28 from the mower 20 and may be secured back into position by re-engaging the fasteners or clips.

Engine 30 powers wheels 26 and drives cutting deck assembly 31. Engine 30 is positioned rearward of seat 28 and discharges exhaust through a muffler 33 forward of a rear end of bed 32. In the example illustrated, engine 30 comprises an internal combustion engine. The muffler 33 may be positioned such that exhaust may be discharged near either one of the opposing side portions 14 of the frame 22 or may be discharged near the rear portion 12 of the frame 22.

Cutting deck assembly 31 comprises cutting or mower deck 36 and at least one cutting blade (not shown) mounted underneath deck 36 and rotatable under influence of engine 30. The cutting blade severs or cuts grass and other vegetation under power provided by engine 30. In one implementation, each cutting blade receives power by a belt and pulley arrangement operably coupling such cutting blades to engine 30. In other implementations, the cutter deck assembly 31 may include more than one cutting blade (e.g., 2 or 3 blade decks, flail mowers, reel cutters, etc.). In other implementations, the cutting deck assembly 31 may be located in front of the front portion 10 or the cutting desk assembly 31 may be located near the rear portion 12 of the frame 22, near or in between the rear wheels 26.

Figure 2:
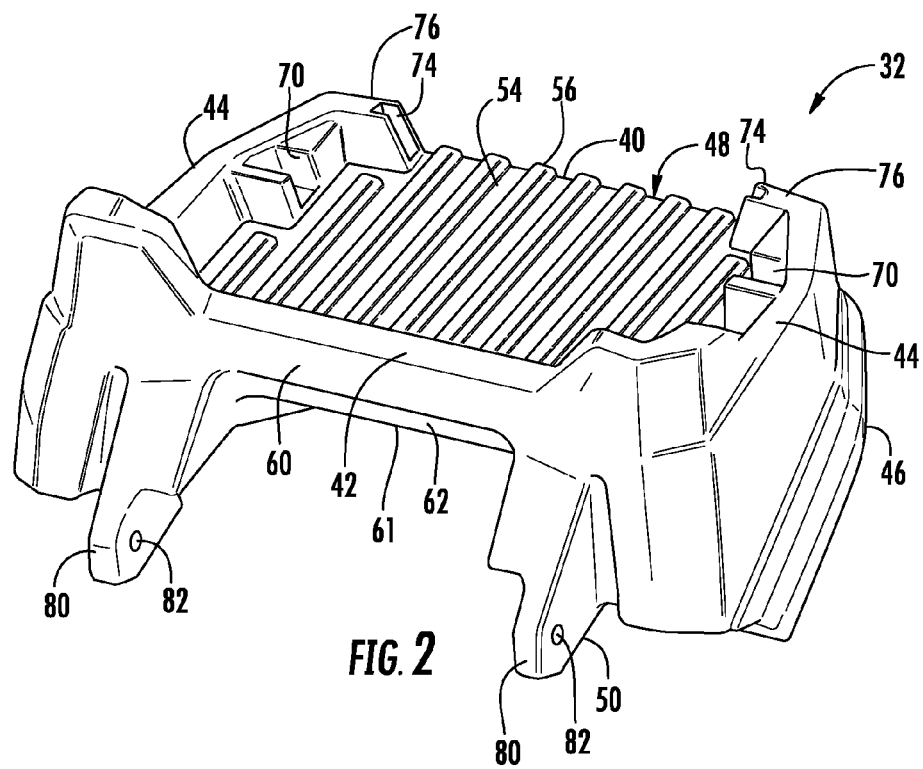
FIG. 2 is a front perspective view of an example bed of the mower.
Figure 3:
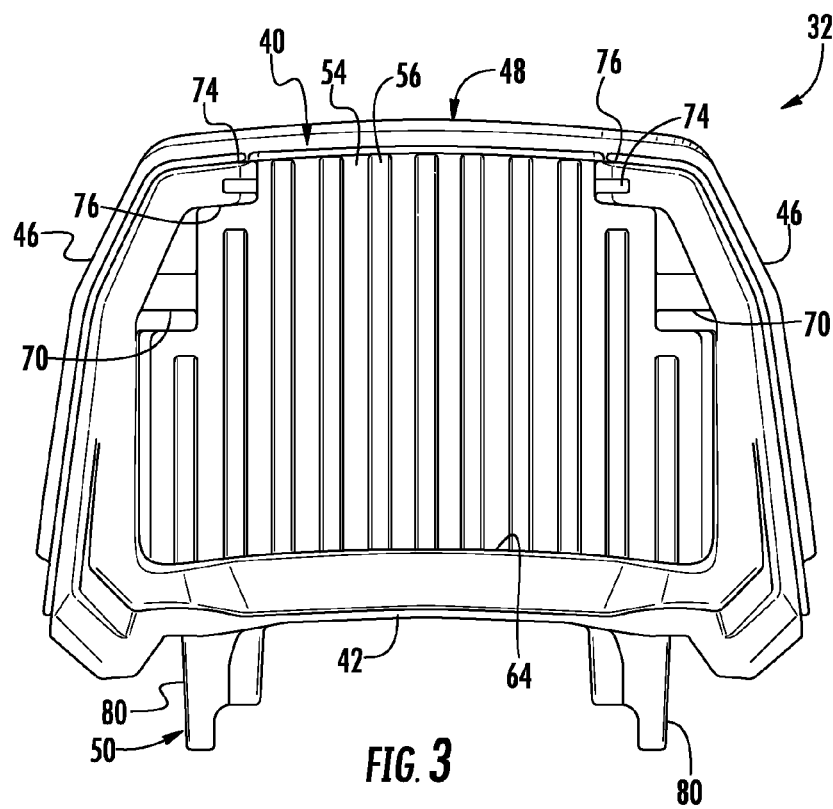
FIG. 3 is a top view of the example bed.
Figure 4:
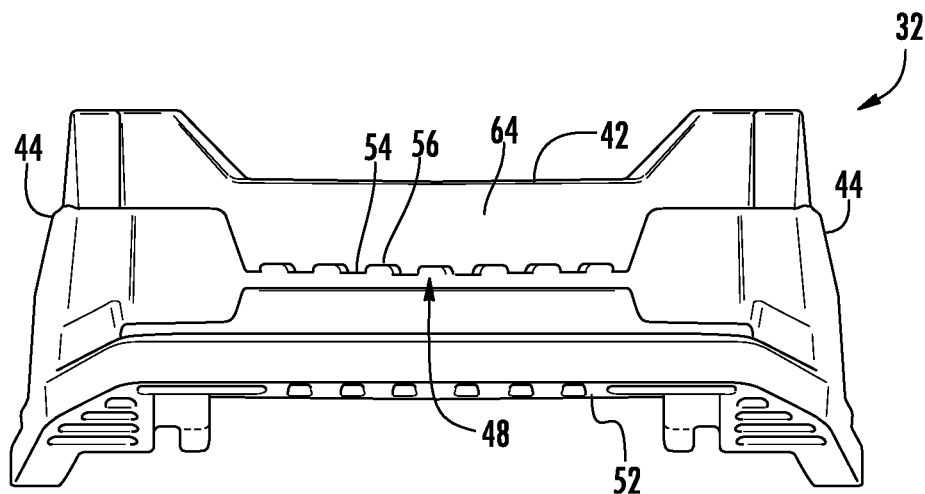
FIG. 4 is a rear view of the example bed.
Figure 5:
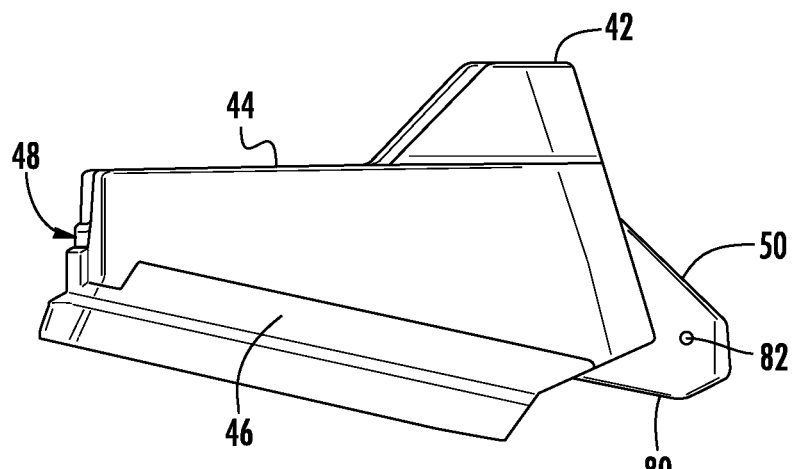
FIG. 5 is a side view of the example bed.
Figure 6:
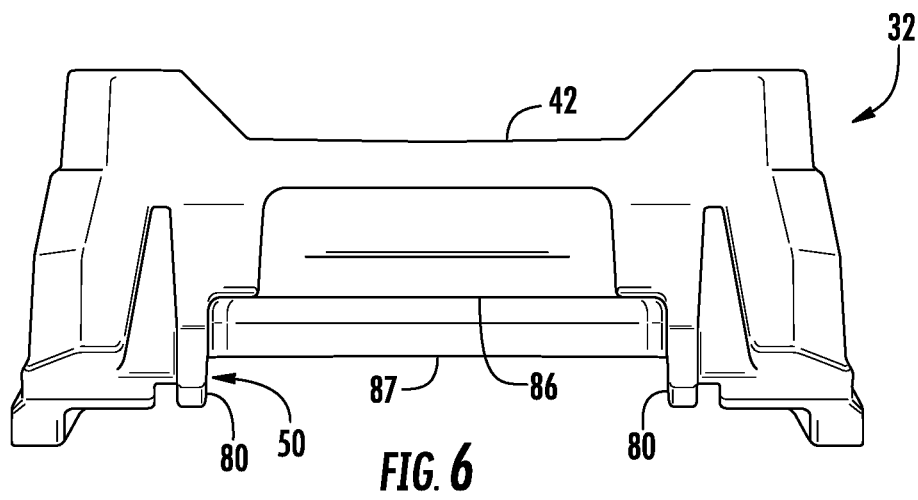
FIG. 6 is a front view of the example bed.
Figure 7:
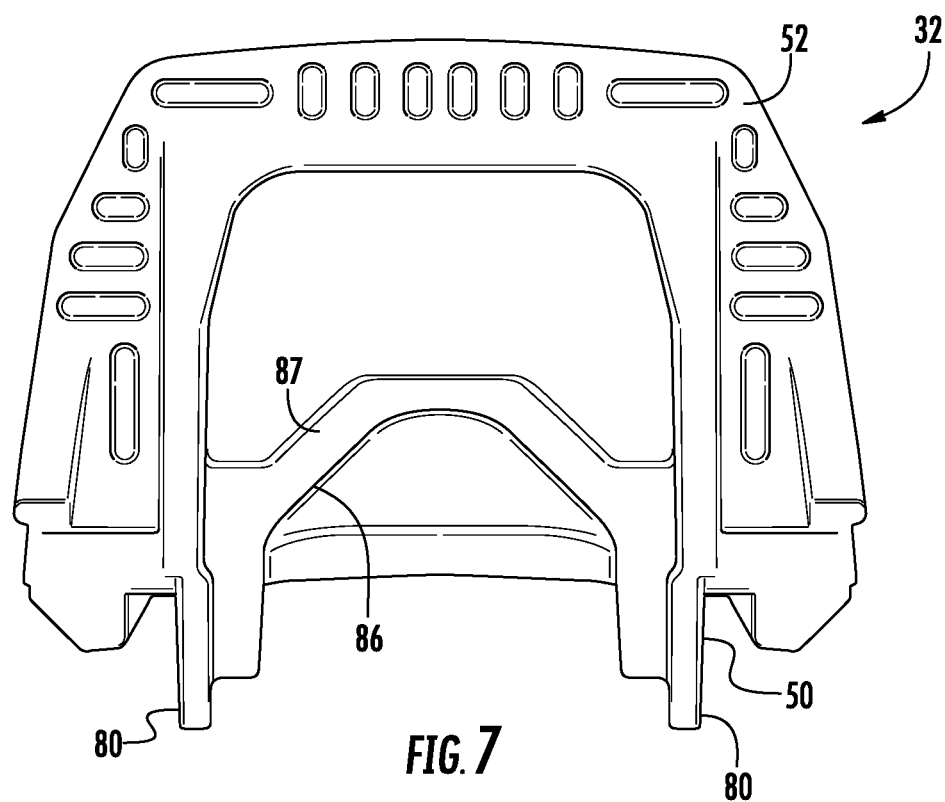
FIG. 7 is a bottom view of the example bed.

Utility bed 32, sometimes referred to as a box, carrier, bucket or the like, is mounted to frame 22 rearward of seat 28 at least partially over and or above engine 30. FIGS. 2-7 illustrate utility bed 32 separated and removed from mower 20. FIG. 2 is a front top perspective view of utility bed 32. FIG. 3 is a top view of utility bed 32. FIG. 4 is a rear view of utility bed 32. FIG. 5 is a left side view of utility bed 32, the right side being a mirror image of the left side view shown. FIG. 6 is a front view of utility bed 32. FIG. 7 is a bottom view of utility bed 32

As shown by FIGS. 2-7, utility bed 32 comprises floor 40, front wall 42, sidewalls 44, sides 46, rear 48, mounting portion 50 and bottom 52 (shown in FIG. 7). Floor 40 comprises an upwardly facing surface upon which cargo or payload rests upon bed 32. Portions of the sidewalls 44 extend from floor 40 along the rear 48 of the bed 32 forming a pair of partial end walls 76. Front wall 42, sidewalls 44 and partial end walls 76 extend up from floor 40 forming a semi-enclosed volume. Floor 40 extends at least partially over engine 30. In other implementations, sidewalls 44 are omitted. In other implementations, front wall 42 and sidewalls 44 are differently shaped or may have different dimensions.

In the example illustrated, floor 40 extends in a substantially horizontal or flat plane. In other implementations, floor 40 is sloped rearwardly to facilitate drainage of any materials or liquid upon floor 40 or extend in a substantially flat plane. In another implementation, floor 40 is sloped forwardly to assist retaining articles upon bed 32. In the example illustrated, floor 40 comprises a multitude of parallel grooves, channels or drain flutes 54 extending in a front to rear direction between corresponding ribs 56. Flutes 54 provide structural support, strengthening floor 40. In addition, flutes 54 direct any spilled fluids, granular material, etc. rearwardly from the front wall 42 towards the rear 48. In another implementation, the floor 40 may be angled at a 15° incline or a 15° decline from either the front wall 42 or from the rear 48. In other implementations, the floor 40 may be angled at an incline or a decline at more or less than 15° from either the front wall 42 or from the rear 48. For example, the floor may be angled from the front wall 42 or from the rear 48 at an incline or decline of about 5° to about 45°, specifically, of about 10° to about 30°, and more specifically of about 15° to about 20°.

In other implementations, flutes 54 and ribs 56 may have other shapes or may be omitted. In other implementations, floor 40 may have other upper surface configurations to facilitate the retention of articles upon floor 40 or to reduce slippage of articles upon floor 40. For example, in other implementations, floor 40 may include dimples, shaped protuberances, such as diamonds, triangles, semi-spheres, cylinders or manufacture, supplier or company logos. In some implementations, in lieu of a substantially flat or extending in a substantially horizontal plane, floor 40 is concave, forming a bowl.

In the example illustrated, floor 40 is imperforate, lacking any holes that extend through floor 40 or through the surface of bottom 52. As a result, floor 40 prevents chaff, dirt, grass clippings, fluids, or other particles or materials from sifting or falling through floor 40 onto and into engine 30. Likewise, liquids being transported upon bed 32, that happen to spill, do not pass through floor 40 into contact with the potentially hot engine 30.

In the example illustrated, floor 40 is 100% or completely imperforate to effectively prevent any spilled fluids or particles from passing through floor 40 into contact with engine 30. For purposes of this disclosure, the term "imperforate" may be used to describe a type of material/fabric of floor 40 or to describe the area percentage of the floor 40 that may have openings that allow materials or fluids to pass through the floor 40 and onto engine 30. The floor 40 of bed 32 may be a mesh material that allows small granules or liquids to pass through the floor 40 onto engine 30 and inhibits larger pieces of materials from passing through the floor 40, such as rocks, leaves, sticks, etc. Imperforate when used without any limiting percentage, such as X % imperforate, refers to a floor that is 100% or completely imperforate in which the floor 40 is of a material (e.g., molded polymer, steel, etc.) and does not have any openings in the floor 40 that may permit any type of materials, fluids, etc. spilled onto the floor 40 to pass through the floor 40 and onto the engine 30. In other implementations, floor 40 may be perforate, allowing some materials, fluids, etc. to pass through the floor 40 and onto the engine 30. For example, floor 40 may be of a molded polymer that includes openings in 10% of the area of the floor 40. The openings permit materials and fluids to pass through the floor 40 and onto engine 30. Therefore, the floor 40 is at least 90% imperforate and 10% perforate, wherein 90% of the total area of floor 40 is lacking holes or openings therethrough. In still other implementations, floor 40 may be more or less than 90% imperforate.

In other implementations, floor 40 comprises openings which are occluded or blocked with one or more plugs that are inserted into such openings. In the example illustrated, floor 40 is a double walled or double skinned platform, wherein a first wall forms the floor 40 and second wall, spaced from the first upper wall, forms bottom 52.

In one implementation, the first and second walls forming the double walled construction of floor 40 are spaced by a hollow interior. In yet another implementation, the first and second walls forming the double walled construction of floor 40 are filled or at least partially filled with a sound insulating foam. The double walled construction of floor 40 provides structural strength, lower weight and sound blocking/absorption for the vibration and noise emitted by engine 30. In yet other implementations, floor 40 and bottom 52 are formed by, and comprise, a single solid wall or panel of a molded polymer or other material.

Figure 8:
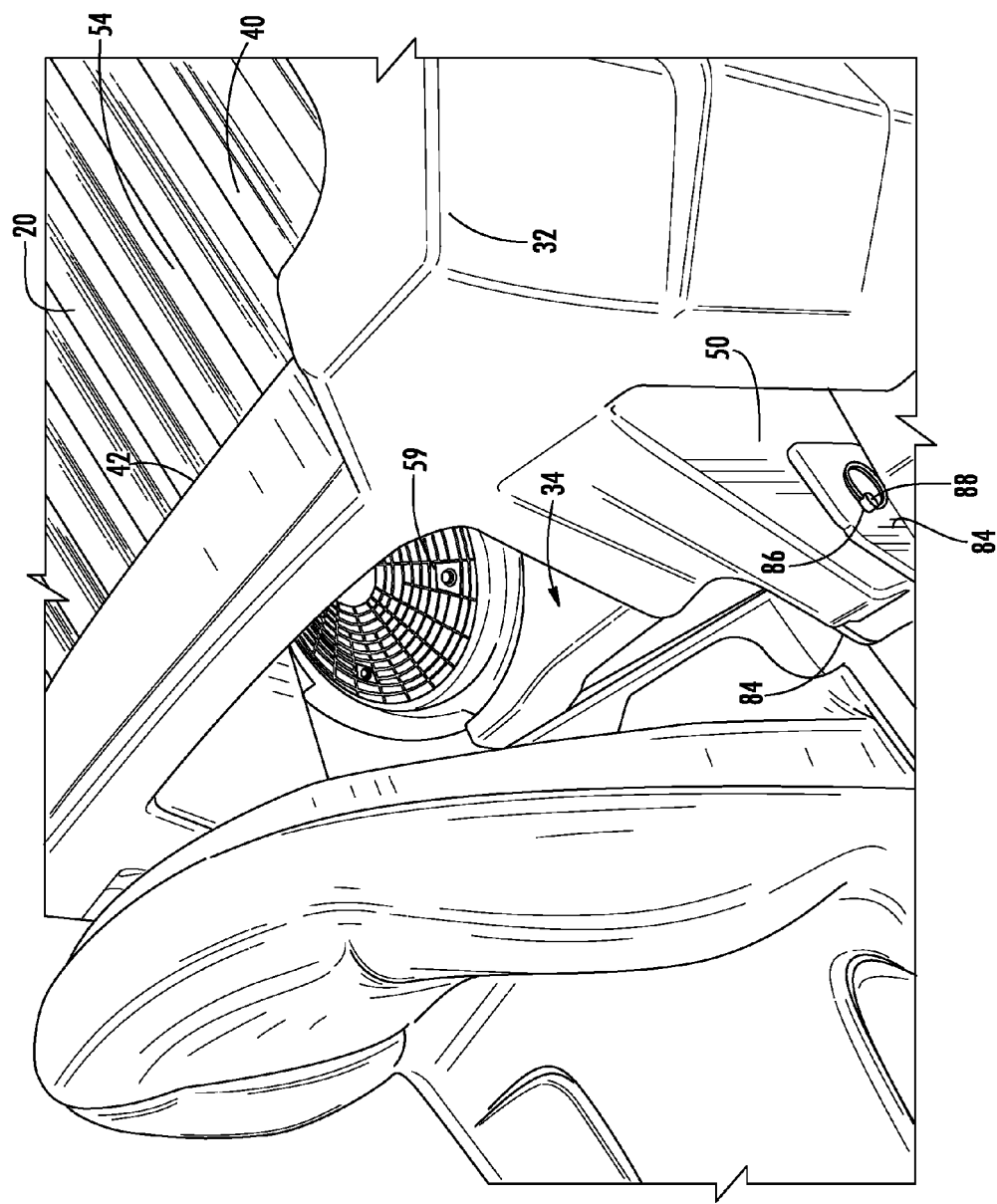
FIG. 8 is a fragmentary perspective view of a portion of the mower of FIG. 1.

Front wall 42 extends transversely across floor 40 on an end of floor 40 opposite to rear 48, between sidewalls 44. As shown by FIG. 8, when bed 32 is mounted to frame 22 (not shown) by mounting portions 50, front wall 42 and floor 40 only partially cover a cooling air intake 59 of engine 30. The air intake 59 is upwardly facing located on the upper portion of the engine 30 with a portion of the air intake 59 below the floor 40. An opening 61 (shown in FIGS. 2 and 17) to the air intake 59 may be located between the seat 28 and the bed 32. In the example illustrated, opening 61 is formed within the front side of bed 32. The amount of debris ingested through the engine 30 may be reduced when the opening to the air intake 59 is between the seat 28 and the bed 32. In other implementations, the opening to the air intake 59 may be located on one of the opposing side portions of the frame near one of the rear wheels. In other implementations, the opening to the air intake 59 may be located on the rear portion of the frame behind the rear wheels. In still other implementations, the opening may be located on sidewalls 44 of bed 32 or near rear 48 of bed 32 in the form of a series of holes or slots.

In the example illustrated, a forward surface 60 of front wall 42 extends directly above air intake 59 from a 10 o'clock position to the 2 o'clock position. The air intake 59 includes a screen 58. In other implementations, the air intake 59 may not have a screen 58. In the example illustrated, the air intake 59 directs cooler air surrounding the engine 30 to flow around the engine 30 and to pass through the screen 58 to cool the engine 30 to prevent the engine 30 from getting too hot and overheating, which may lead to the engine 30 to malfunction. As shown by FIG. 2, front wall 42 includes a ramp surface 62 extending from the forward surface 60 to the bottom 52. In the example illustrated, the engine 30 includes a fan (not shown) having a rotational axis (not shown) located below the screen 58. The ramp surface 62 extends beyond the rotational axis of the fan towards the front wall 42. As a result, a larger volume or passage is provided to air intake 59 for greater airflow to cool engine 30. As further shown by FIG. 3, front wall 42 has an interior surface 64 located rearward of the rotational axis of the fan below screen 58 extending up from the floor 40 towards a top portion of the front wall 42.

Sidewalls 44 extend rearwardly from front wall 42 to contain a payload in a transverse direction upon floor 40. In the example illustrated, sidewalls 44 have a height of at least 1 inch and nominally at least 2 inches. In other implementations, sidewalls 44 may have a height of 4 inches, 6 inches, 12 inches or more. In still other implementations, sidewalls 44 may have different heights from each other. For example, one of the sidewalls 44 may have a height of 2 inches and the opposing sidewall 44 may have a height of 5 inches. In other implementations, sidewalls 44 may include a plurality of slots to permit cooling air to flow through the slots of the sidewalls 44 and be drawn into the air intake 59 to cool the engine. In the example illustrated, sidewalls 44 comprise a pair of aligned channels 70 which are configured, shaped or sized to receive a panel 72 (see FIG. 9) to extend across floor 40. In one implementation, channels 70 are spaced from front wall 42 by a distance of between 9 inches and 12 inches. As a result, when the panel 72 is placed within channels 70, a standard 5 gallon bucket having a diameter of about 10.24 inches (26 cm) may be secured on the bed 32 between the panel and front wall 42. In one implementation, bed 32 is dimensioned such that the total clearance between one of the sidewalls 44 and the payload, e.g., 5 gallon bucket, is no greater than 0.0125 inches. In one implementation, bed 32 is dimensioned such that the payload is secured such that portions of the payload are concurrently in contact with a portion of one of the sidewalls 44 or a portion of both of the sidewalls 44 so as to resist any movement perpendicular to the sides of the payload. In one such implementation, a sufficient degree of friction is provided between the sides of the payload and the bed 32 that about 1 pound to about 25 pounds, specifically, of about 3 pounds to 15 pounds, more specifically, of about 5 pounds to 10 pounds of force is required (above what force is otherwise needed to lift the structure in the absence of any friction) to move the payload in a direction parallel to the opposite sides of the payload. In the example illustrated, a cavity defined by the panel received within channels 70, front wall 42 and the portions of sidewall 44 between front wall 42 and the panel has a width of at least 20.5 inches and a length (front to rear) of between 9 inches and 12 inches so as to securely receive and retain a pair of standard or typical 5 gallon buckets. The payload secured on the bed 32 may be removed from the bed 32 and reinserted onto the bed 32 upon the preference of a user. The panel 72 inserted into channels 70 may also be removed and reinserted upon the preference of the user.

Figure 9:
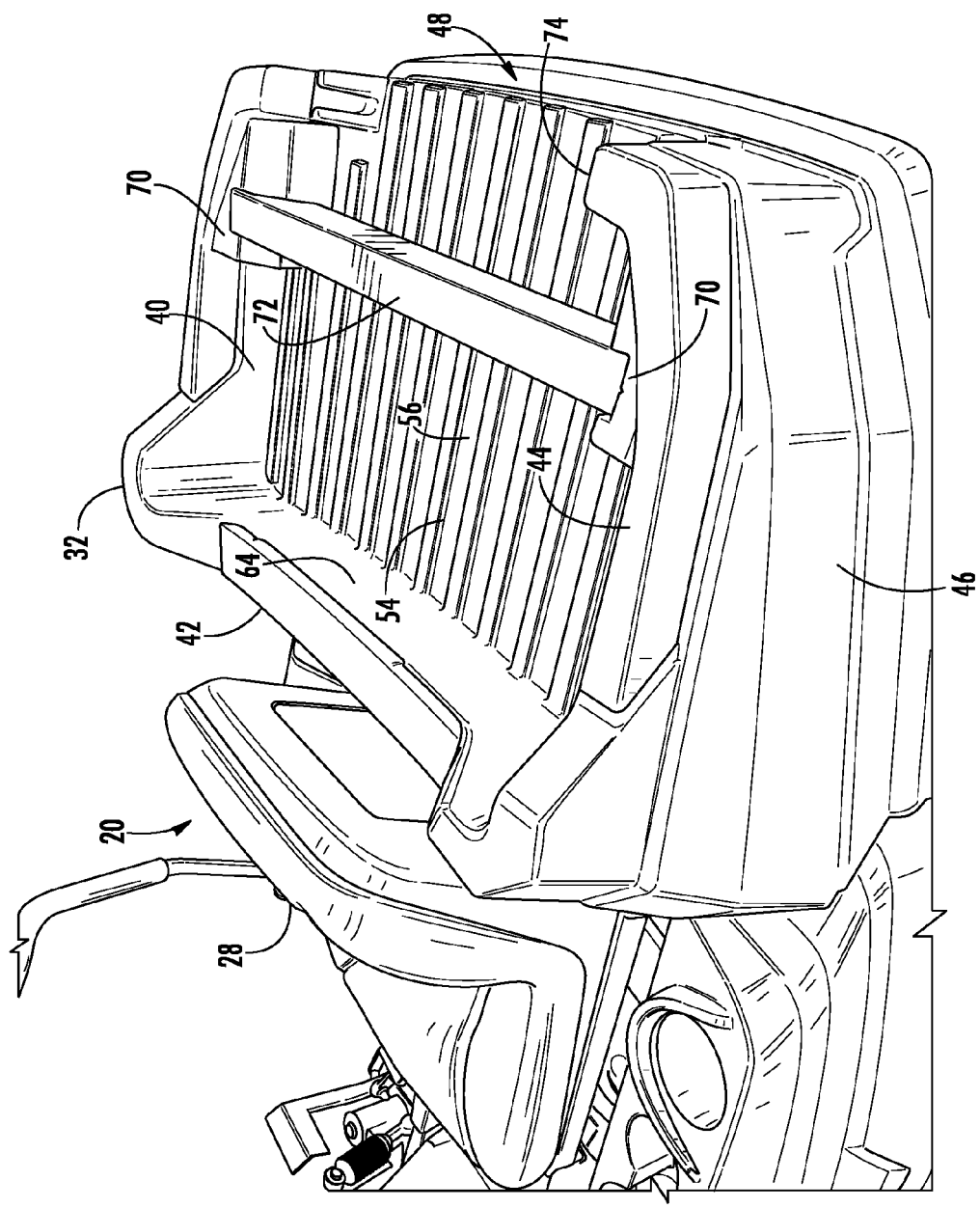
FIG. 9 is a fragmentary perspective view of another portion of the mower of FIG. 1.
Figure 10:
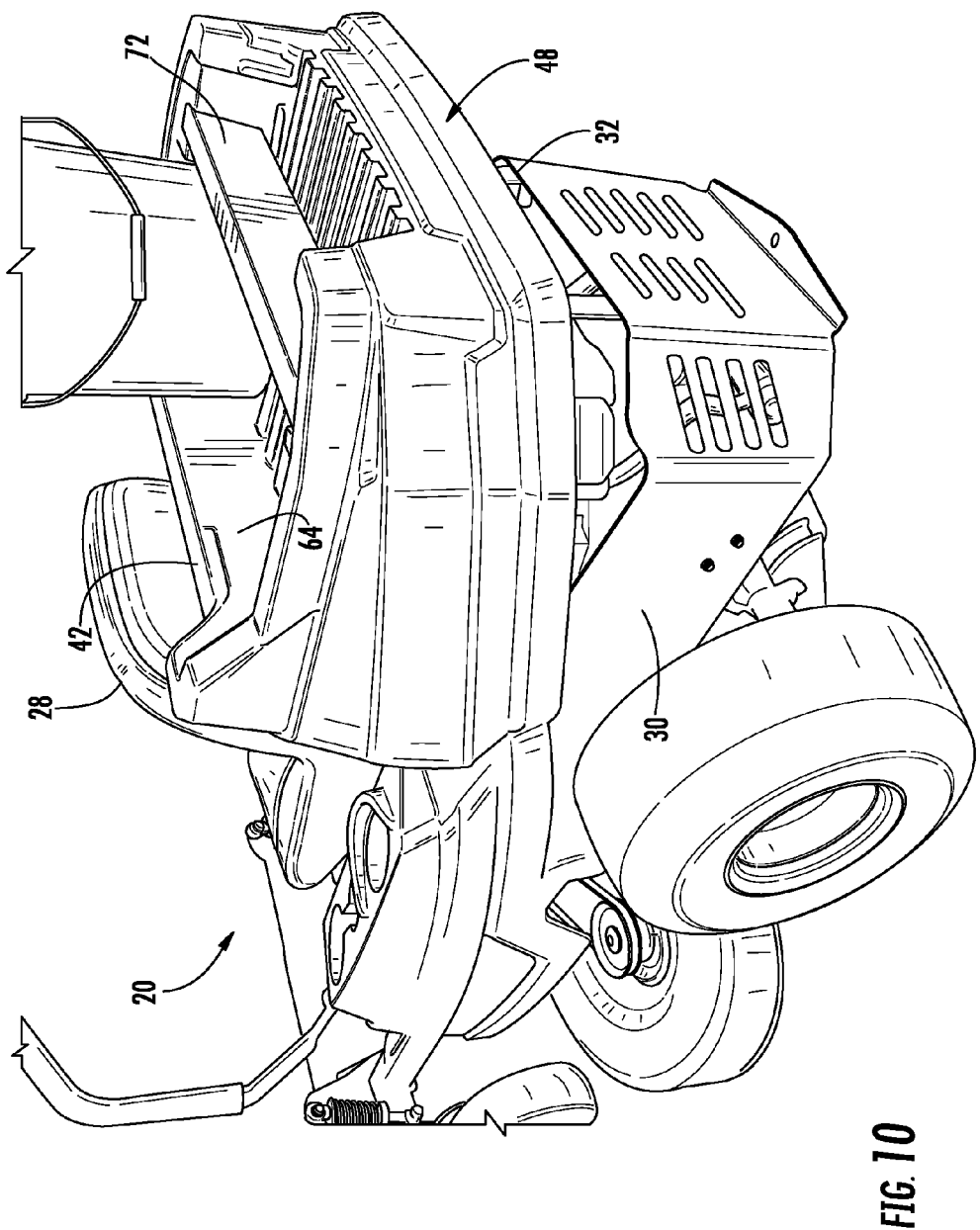
FIG. 10 is a rear fragmentary perspective view of the mower of FIG. 1.

FIG. 9 illustrates bed 32 with channels 70 receiving a panel 72. In the example illustrated, channels 70 are sized to receive ends of a 2×4 board so as to retain the 2×4 board on its edge across floor 40. In the example illustrated, each of channels 70 has a width of at least 1.5 inches and less than or equal to 1.75 inches for securely retaining the 2×4 board in the orientation illustrated in which the edges of the board face up and down within channel 70. In other implementations, the channels 70 may be sized to receive other desired dimensioned materials, e.g. 2×6, 2×8, 4×4, 6×6, etc. panels, planks or other structures. FIG. 10 illustrates the formed cavity securely receiving and retaining a typical 5 gallon bucket.

As further shown by FIGS. 2 and 3, sidewalls 44 additionally include a second pair of aligned channels 74 adjacent to rear 48 of floor 40. Channels 74 are configured to receive ends of a second panel that is to extend across floor 40 near the rear 48. In the example illustrated, channels 74 have a width to receive ends of a 1×4 board with the edges of the 1×4 board facing upwardly and downwardly within channels 74. In other implementations, channels 74 each have a width to receive ends of a 2×4 board or to receive other desired dimensioned materials, e.g. 2×6, 2×8, 4×4, 6×6, etc. For example, one implementation, each of channels 74 has a width of at least 1.5 inches and less than or equal to 1.75 inches for securely retaining the 2×4 board in the orientation illustrated in which the edges of the board face up and down within channels 74. The second panel inserted into channels 74 may also be removed and reinserted upon the preference of the user. In other implementations, the bed 32 may include additional channels located in the front wall 42 or the partial end walls 76 along the rear 48. The front wall 42 and the partial end walls 76 may include more than one channel, wherein each channel aligns with another channel on opposing sides of the bed 32. For example, a channel may be formed in the front wall 42 to receive a third panel that abuts with a first panel within the first channels 70 forming a 90° angle.

In the example illustrated, sidewalls 44 angle and turn inwardly so as to transversely extend (perpendicular to the forward and rearward direction) towards each other towards the rear 48 to form the partial end walls 76, wherein channels 74 are formed within end walls 76. In other implementations, end walls 76 are omitted, wherein channels 74 may be formed within rearwardly extending portions of sidewalls 44. In yet other implementations, end walls 76 extend into close convergence with one another at rear 48 or extend all the way across rear 48. In such implementations, channels 74 may be omitted. In still other implementations, sidewalls 44 include additional channels for the reception of additional panels so as to further compartmentalize the volume of floor 40.

As shown by FIG. 3, sides 46 extend alongside sidewalls 44 from the front wall 42 to the rear 48 below floor 40. In the example illustrated, sides 46 curve towards one another or are convex a front to rear direction. In the example illustrated, sides 46 and rear 48 are further joined by rounded rear corners. In implementations where mower 20 comprises a zero turn radius mower, such rounding of sides 46 is especially beneficial to reduce a likelihood of bed 32 catching upon external obstructions.

As shown by FIG. 5, bed 32 has the greatest height at its forward side and a lesser height proximate rear 48. As a result, bed 32 has a center of gravity or center of mass closer to mounting portion 50 as compared to rear 48. Because the center of mass of bed 32 is more forward than it is rearward, the center of mass of bed 32 is closer to the axis 36, providing mower 20 with enhanced stability despite the additional weight of bed 32 and its payload.

As shown by FIG. 10, rear 48 projects rearwardly beyond the shielding about the muffler (not shown) of engine 30. Rear 48 projects rearwardly beyond such shielding and the muffler by a distance such that any payload, liquid or material does not fall onto the muffler or shielding, which may be hot. As a result, payload falling off of the rear 48 of bed 32 is less likely to come into contact with the hot muffler or the rear of engine 30.

Mounting portion 50 mounts bed 32 to frame 22 of mower 20. As shown by FIGS. 2, 3, 5 and 6, in the example illustrated, mounting portion 50 comprises a pair of forwardly projecting arms 80 which form a clevis. Each arm 80 includes a sleeve or bore 82 for reception of a pivot or mounting pin. As shown by FIG. 8, each of arms 80 angles or is ramped forwardly for being received within a bracket 84 of frame 22. Because arms 80 are angled forward, bed 32 is pivotally mounted to frame 22.

The bed 32 is mounted forward of axis 36 and extends over engine 30. The weight of the payload of bed 32 is closer to axis 36 of rear wheels 26 than the pivot point between the bracket 84 and arms 80. As a result, mower 20 remains substantially stable such that the use of front weights to counter the torque of the payload upon bed 32 may be avoided. In some implementations, front weights may be added to mower 20 forward of axis 36.

Each bracket 84 includes a pair of sleeves or openings 85 that are in alignment with bores 82. FIG. 8 further illustrates pins 88 passing through openings 85 and bores 82 to releasably secure a front portion of bed 32 to frame 22. As will be described hereafter, pins 88 provide a pivot axis about which rear 48 of bed 32 is pivotable in a forward direction. In one implementation, seat 28 pivots forwardly to create an open space or bay which receives bed 32 when bed 32 is pivoted forwardly to provide access to the underlying engine 30. Because bed 32 pivots forwardly, payload or debris upon floor 40 is not dumped rearwardly behind engine 30 or the muffler. In other implementations, the bed 32 may be fixed to the frame with a plurality of snaps, brackets, bolts, etc. or any other type of fastening device that may affix bed 32 to the fame 22. In other implementations, the bed 32 may be fastened to the mower 20 such that the user may attach and remove the bed from the mower 20.

Figure 11:
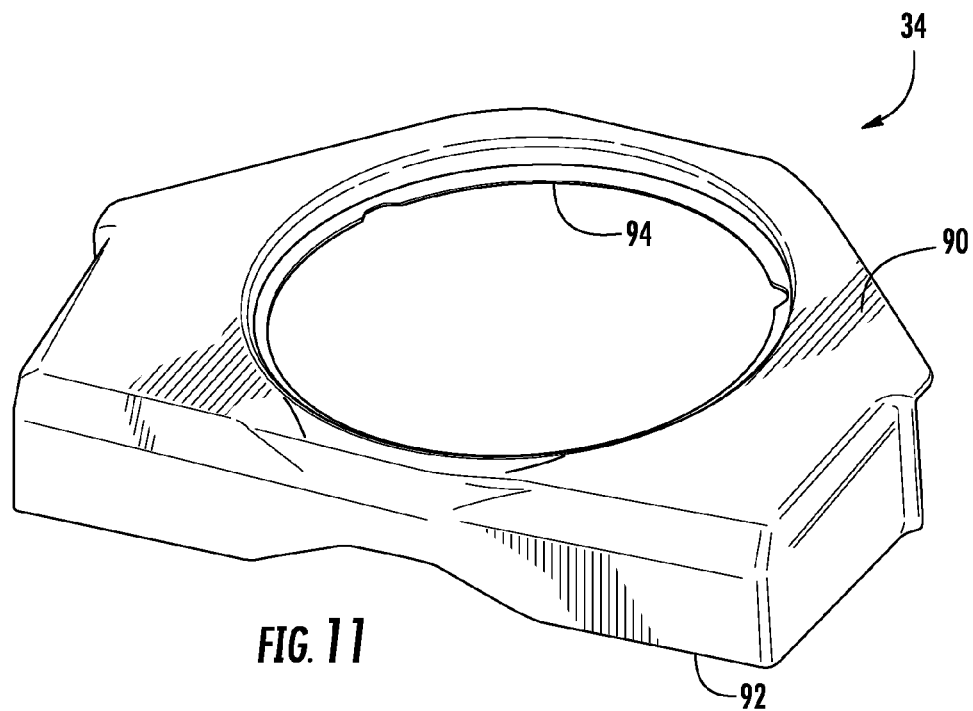
FIG. 11 is a front perspective view of an example plenum of the mower of FIG. 1.
Figure 21:
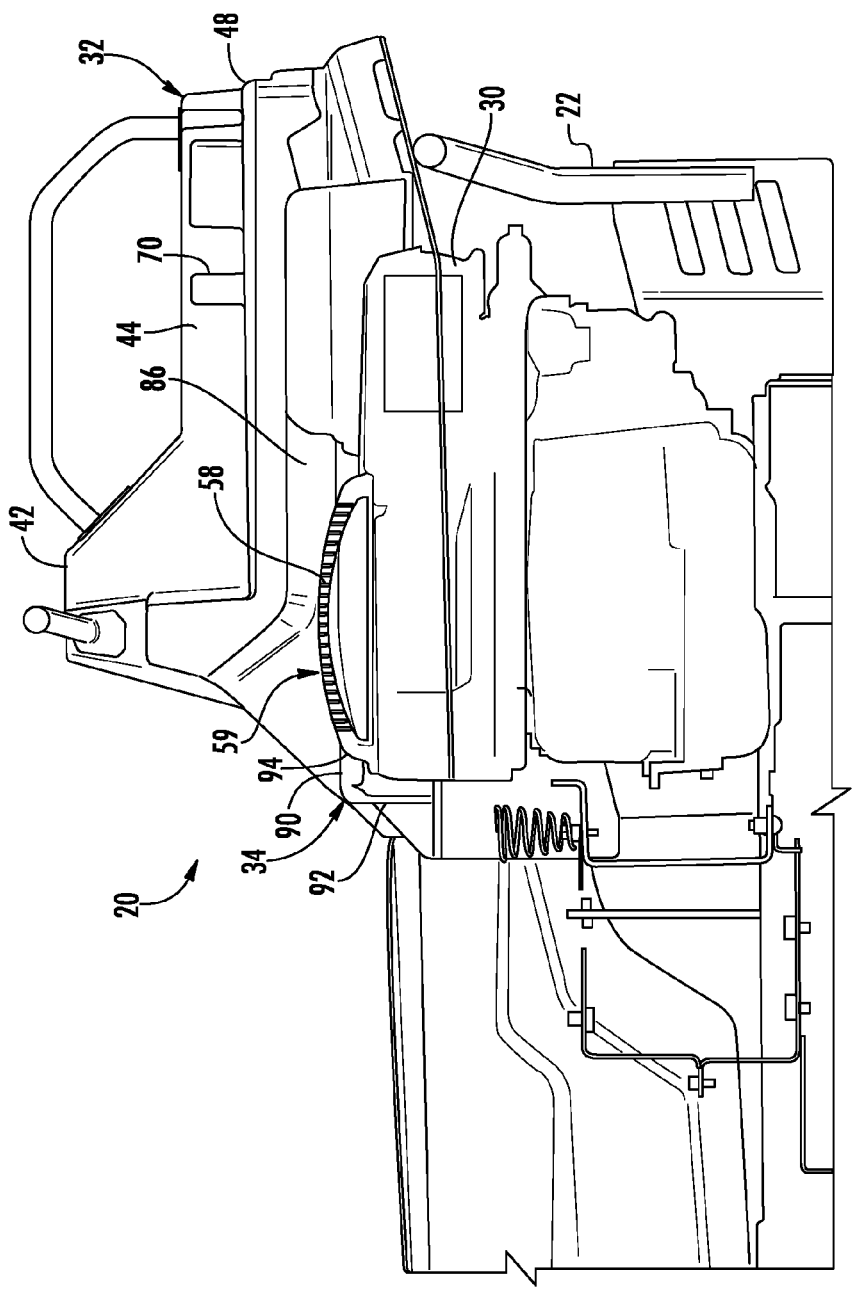
FIG. 21 is a fragmentary sectional view of the portion of the mower of FIG. 17.

As shown by FIGS. 7, 11 and 21, bottom 52 comprises cavity 86. Cavity 86 is configured to extend above plenum 34 (shown in FIGS. 11-13). Cavity 86 cooperates with plenum 34 to form an air flow duct through which cooler air from engine 30 may be drawn to air intake 59. Cavity 86 is defined by walls 87 that facilitate the mounting of plenum 34 to bottom 52 of bed 32 such that plenum 34 is carried by bed 32 and pivoted with bed 32 about the axis provided by pins 88. In one implementation, plenum 34 is fastened to bottom 52 below cavity 86 so as to project downwardly from cavity 86. In other implementations, plenum 34 is bonded, welded, snapped, or otherwise secured to bottom 52 of bed 32 below cavity 86. In some implementations, the sides of cavity 86 are provided by plenum 34. In some implementations, plenum 34 is integrally formed as part of bed 32.

Figure 12:
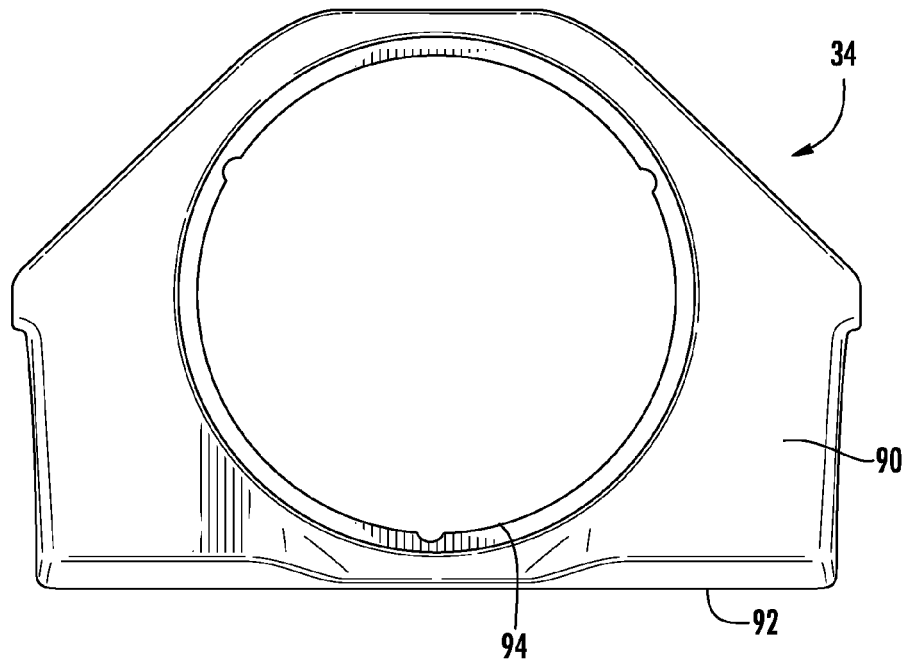
FIG. 12 is a top view of the example plenum.
Figure 13:
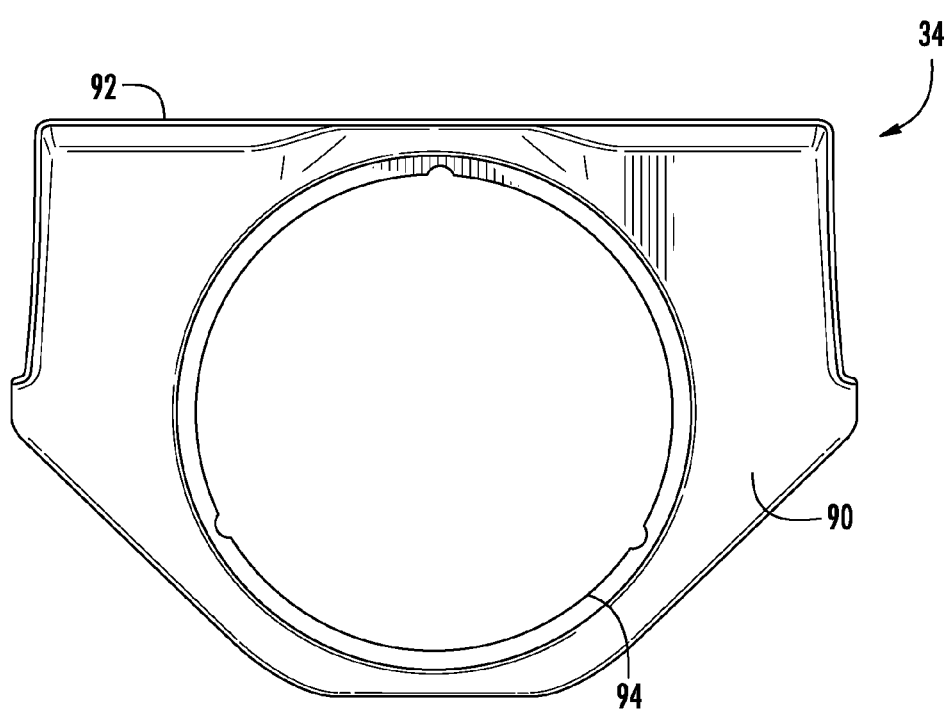
FIG. 13 is a bottom view of the example plenum.

FIGS. 11-13 illustrate plenum 34. Plenum 34 restricts the flow of hot air discharged or emitted by engine 30 back to engine 30 through air intake 59 and screen 58 (shown in FIG. 8). Plenum 34 cooperates with the shape of the bottom 52 of bed 32 (cavity 86) to further direct cooler air, such as air remote from engine 30, air adjacent seat 28 to screen 58 of engine 30. Plenum 34 may be a channel, passageway, opening, etc. that gathers air and facilitates the circulation of the air. Plenum 34 comprises a cover or top portion 90, a skirt 92 and the underside 16. In the illustrated example, the plenum 34 collects hot air from the engine 30 and circulates the air away from the air intake 59 and the screen 58. The hot air from the engine 30 flows horizontally along the underside 16 of the top portion 90, down the skirt 92 and then to the exterior of the plenum 34. The underside 16 of the plenum inhibits the hot air from the engine 30 to flow directly to the air intake 59 and screen 58. FIG. 11 is a top perspective view of plenum 34. FIG. 12 is a top view of plenum 34. FIG. 13 is a bottom view of plenum 34. Top portion 90 comprises an aperture 94 shaped and sized to match the size and shape of a perimeter of screen 58 (shown in FIG. 8) such that the aperture 94 surrounds the perimeter of the screen 58. In the example illustrated, aperture 94 is circular and has a diameter just larger (within 1 inch) of the diameter of screen 58.

Skirt 92 comprises a panel or baffle extending away from top portion 90. In one implementation, skirt 92 extends perpendicularly from top portion 90. In one implementation, skirt 92 has a height of greater than or equal to 2 inches. In other implementations, skirt 92 may have other heights. In other implementations, the plenum 34 may have a bottom surface that is adjacent to the engine 30 having the skirt 92 extending up from the bottom surface towards the bottom 52 of the floor 40. In other implementations, skirt 92 may include a plurality of slots to permit cooling air to flow through the slots of the skirt and the screen 58. In other embodiments, the forward surface 60 may extend from the top portion of the front wall 42 to the bottom 52, thereby closing off the area between the seat 28 and the engine 30.

Figure 14:
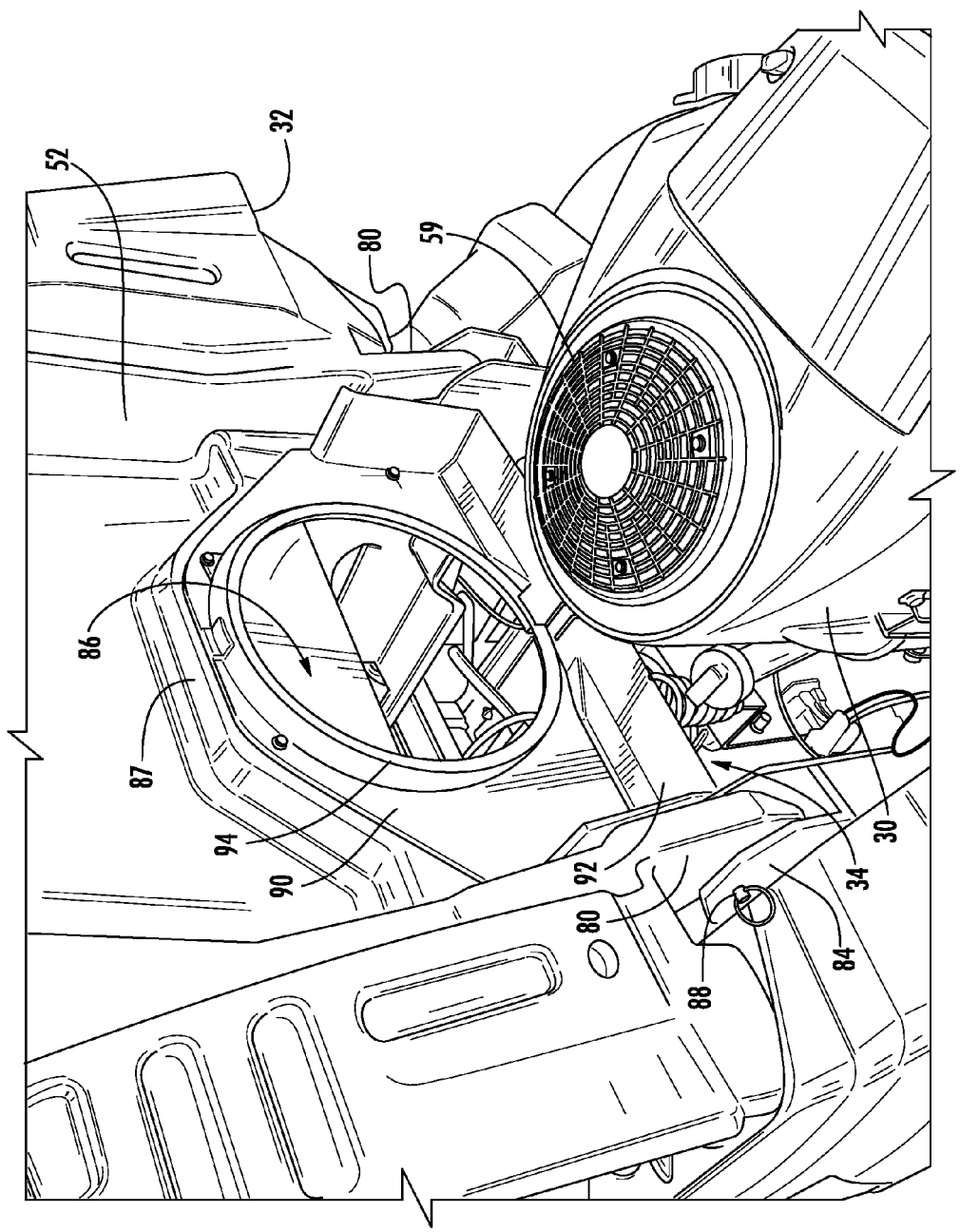
FIG. 14 is a fragmentary perspective view of a portion of the mower of FIG. 1, illustrating the bed in a raised position.
Figure 15:
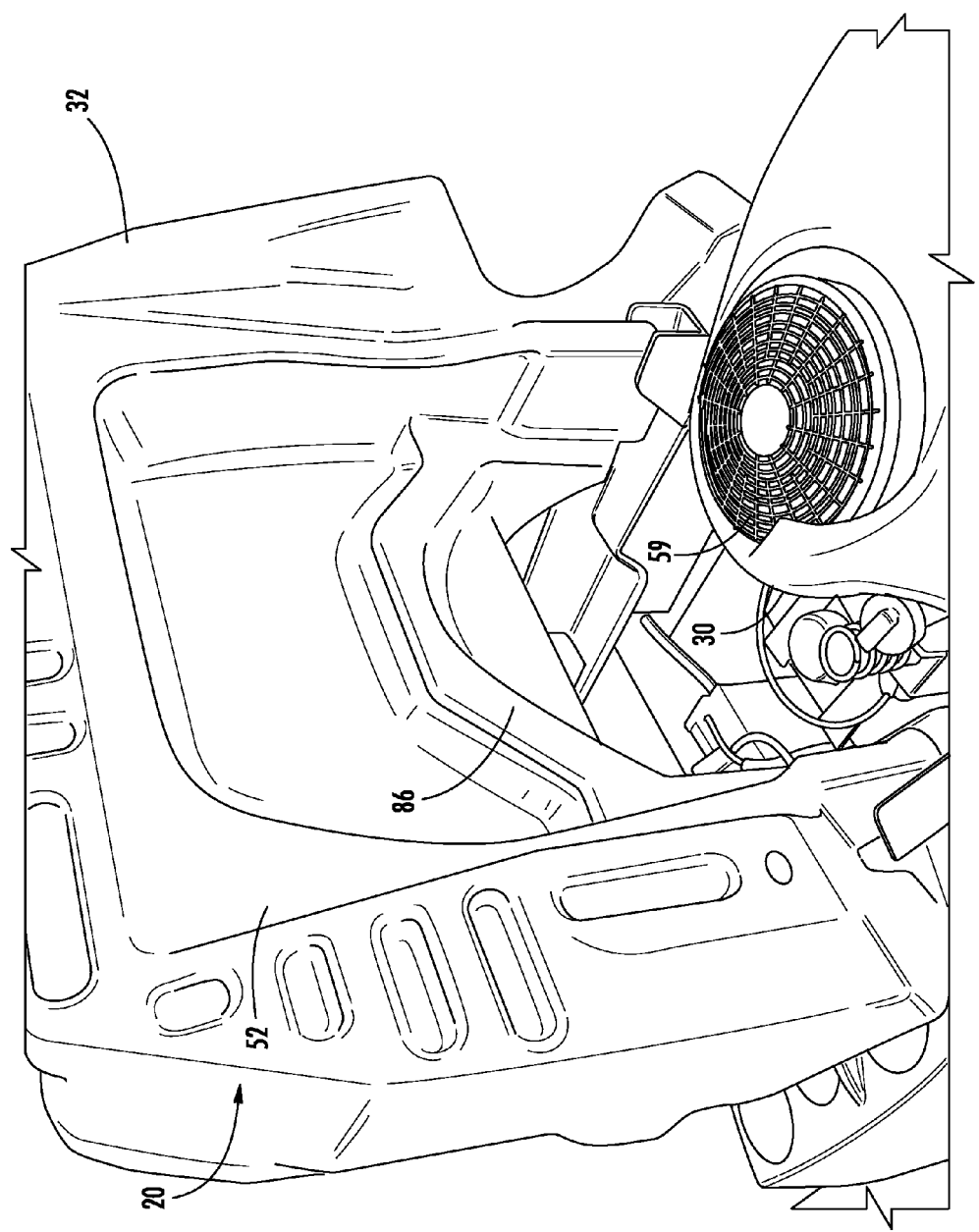
FIG. 15 is a fragmentary perspective view of a portion of the mower of FIG. 1, illustrating the bed in a raised position and removal of the example plenum.
Figure 16:
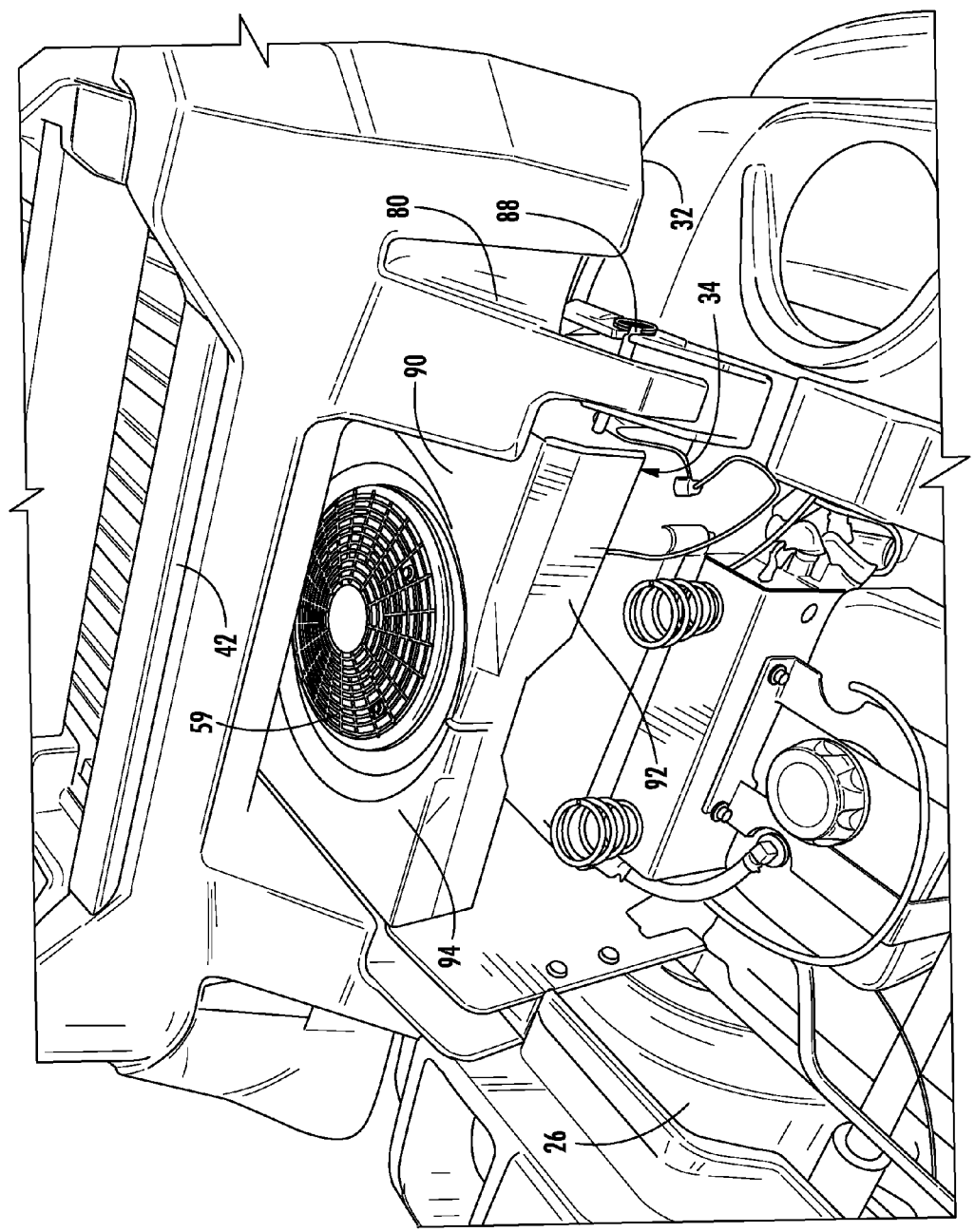
FIG. 16 is a fragmentary perspective view of a portion of the mower of FIG. 1 illustrating the example Plenum about an air intake with the bed in a lowered position.
Figure 17:
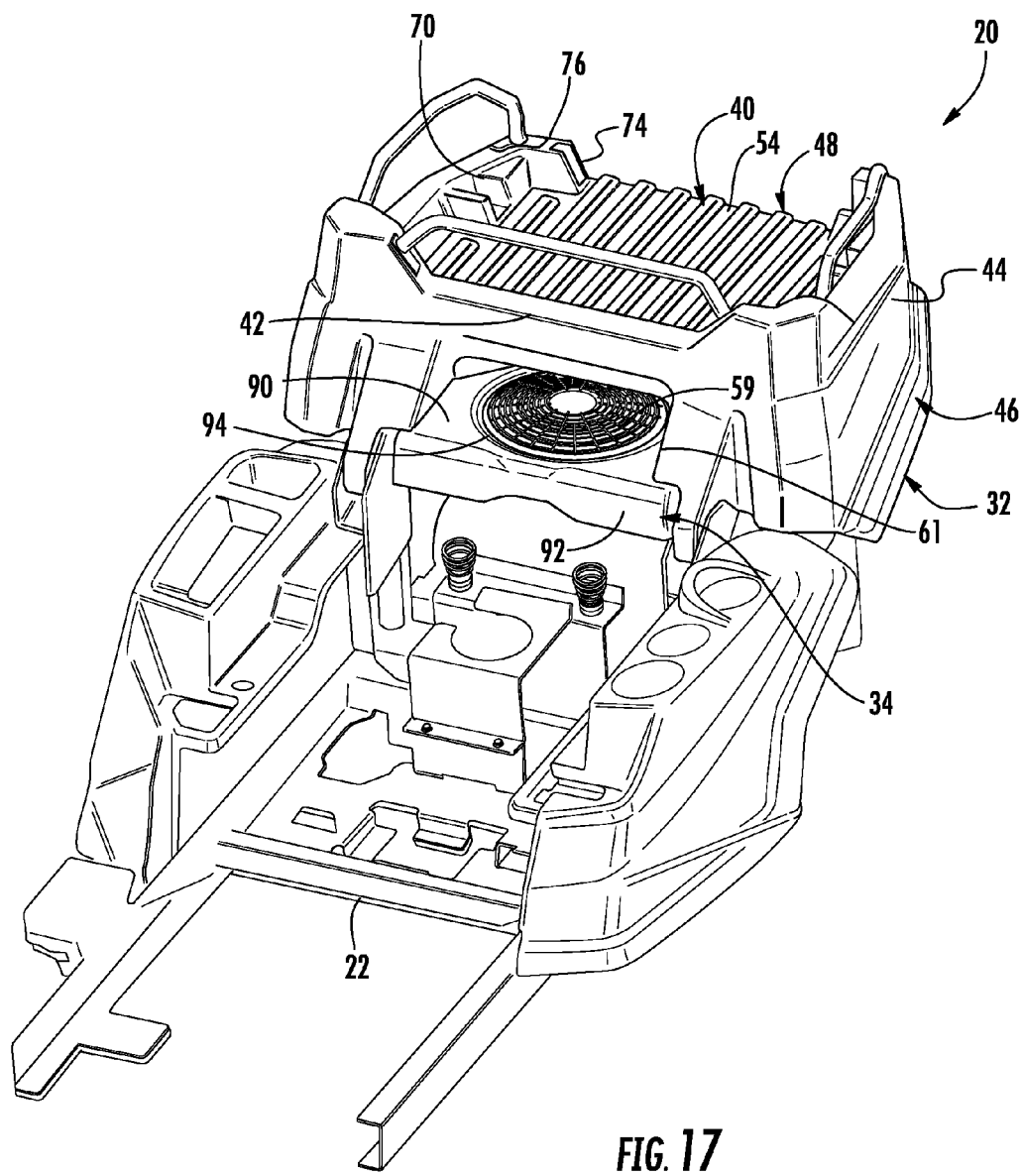
FIG. 17 is a rear perspective view of a portion of the mower of FIG. 1.
Figure 18:
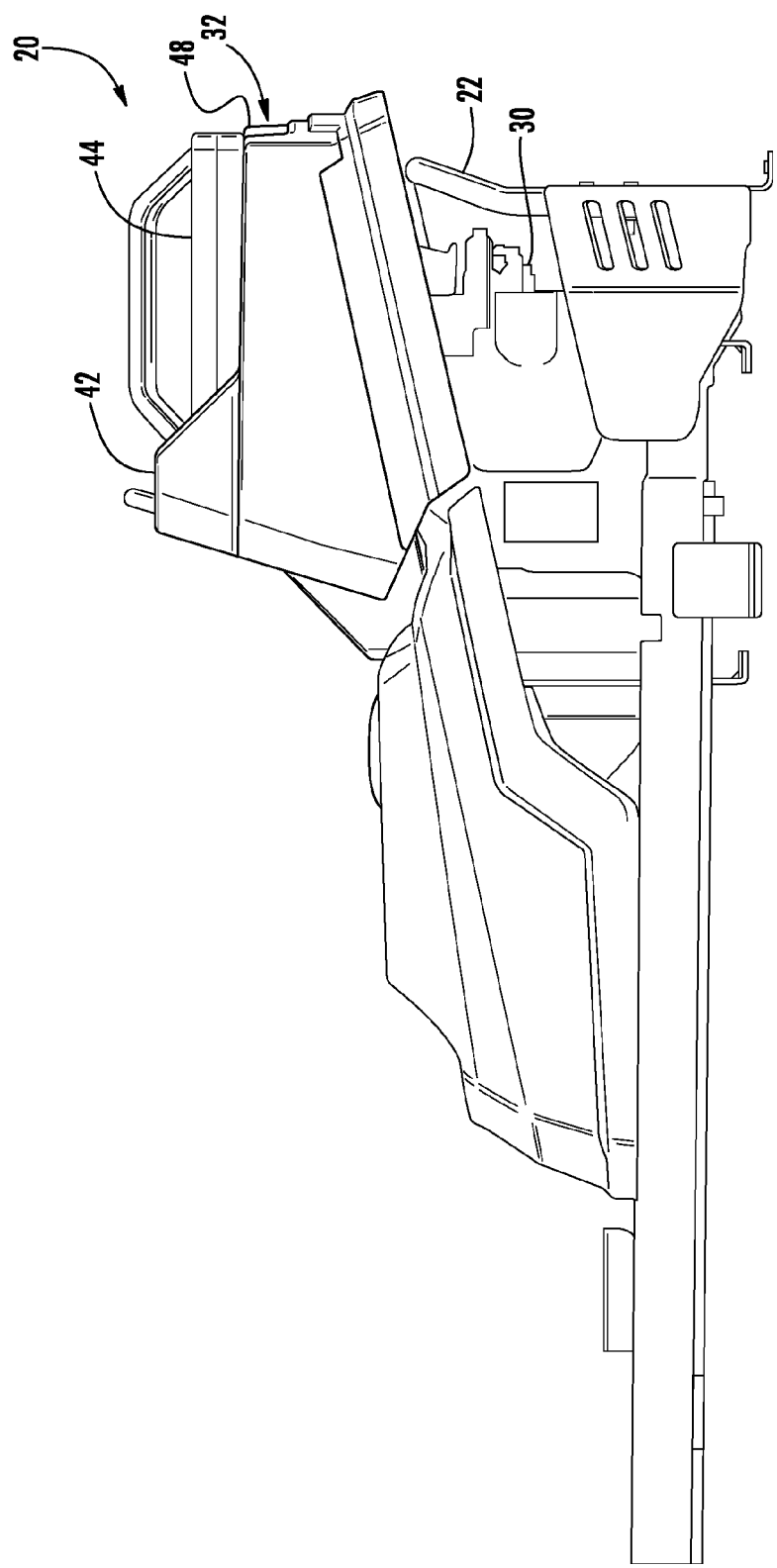
FIG. 18 is a side perspective view of the portion of FIG. 17.
Figure 19:
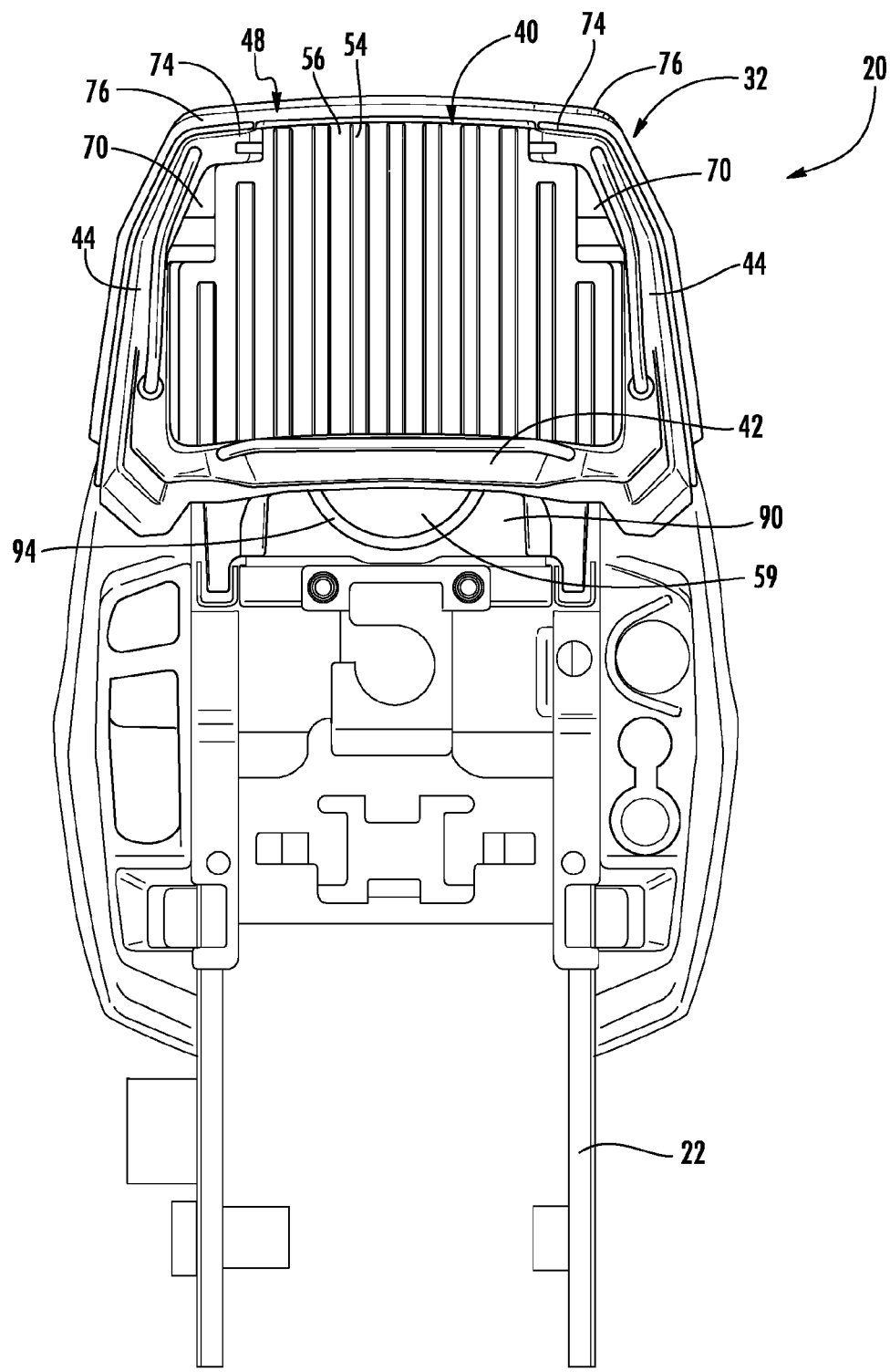
FIG. 19 is a top view of the portion of the mower of FIG. 17.
Figure 20:
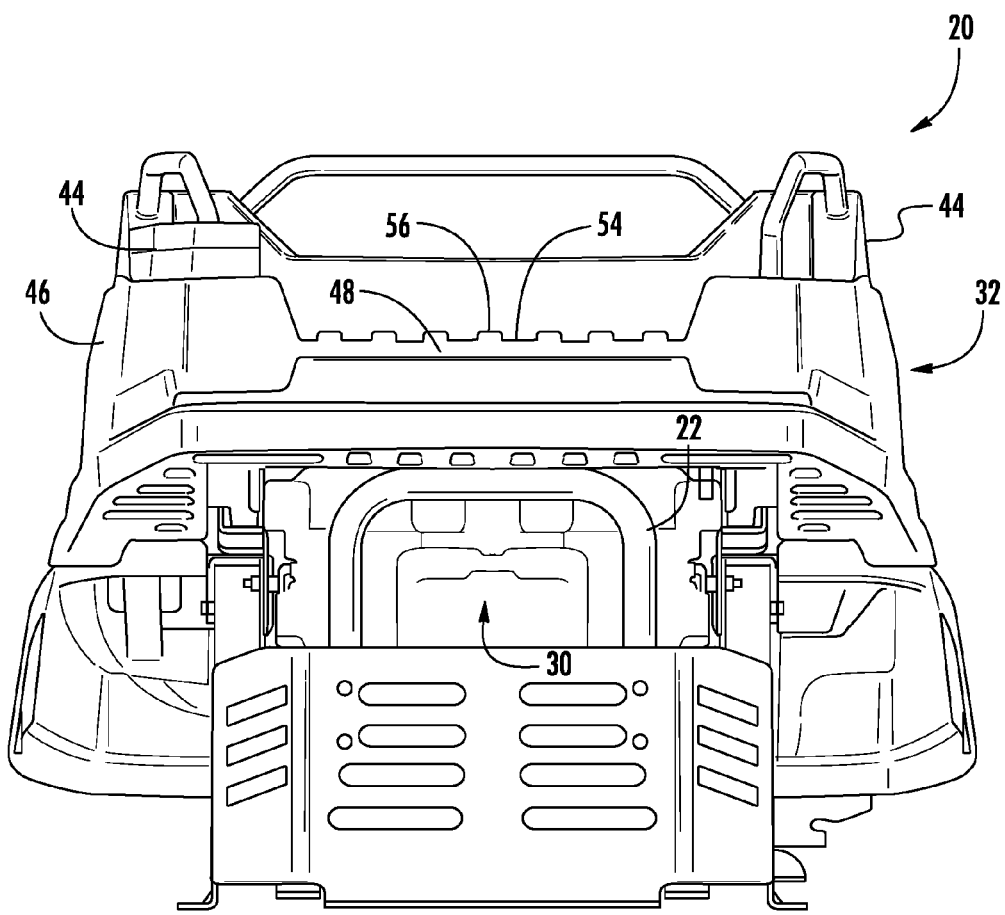
FIG. 20 is a rear view of the portion of the mower of FIG. 17.

FIG. 14 illustrates mower 20 with bed 32 pivoted forwardly away from engine 30. FIG. 14 further illustrates plenum 34 fastened to bottom 52 of bed 32. FIG. 15 illustrates plenum 34 removed from bottom 52 of bed 32. FIGS. 16-21 illustrate bed 32 pivoted rearwardly to a deployed state. FIG. 16 illustrates seat 28 remaining in a pivoted forward state while FIGS. 17-21 omit seat 28 and the entire front portion of mower 20 for purposes of illustration. FIG. 21 is a sectional view of mower 20 of FIG. 17. As shown by FIGS. 16 and 17, when bed 32 is in the deployed state, plenum 34 is pivoted down and about air intake 59 and screen 58 which is received within aperture 94 of top portion 90. Top portion 90 encircles and surrounds air intake 59 and screen 58. As a result, rising heat emitted by engine 30 cannot flow directly to air intake 59 through the screen 58, but must flow horizontally to beyond the perimeter of top portion 90 before the hot air can flow upwardly beyond top portion 90 and through screen 58. This tortuous path alone inhibits the flow of hot or warm air from engine 30 to air intake 59. In other implementations, the plenum 34 may be attached to the engine 30 with a plurality of clips, fasteners, bolts and pins, or another type of fastening device that may connect the plenum 34 to engine 30.

Skirt 92 provides an additional obstruction to the flow of hot air directly to screen 58. Skirt 92 retains the warm air below top portion 90. For the hot or warm air to reach air intake 59, hot air must, after being obstructed by the underside 16, flowed down and around skirt 92 before being allowed to flow upward and across top portion 90 to screen 58. In some implementations, skirt 92 is omitted or has a lesser height.

Plenum 34 obstructs the flow of rising hot air from engine 30 to the engine cooling fan below screen 58. As a result, cooler air adjacent seat 28 and forward of engine 30 is more able to be drawn into air intake 59 to cool the engine. Because plenum 34 restricts the ability of hot air to flow to air intake 59, bottom 52 of bed 32 may be vertically positioned closer to air intake 59. In one implementation, plenum 34 facilitates locating the bottom 52 of bed 32 less than or equal to 1.5 inches directly above screen 58 and nominally less than 1 inch directly above screen 58. Plenum 34 further facilitates mounting bed 32 to frame 22 at a more forward position, extending over air intake screen 58 to a greater extent. Due to the lower positioning and mounting of bed 32 and due to the more forward positioning of bed 32 facilitated by plenum 34, mower 20 is more stable.

Figure 22:
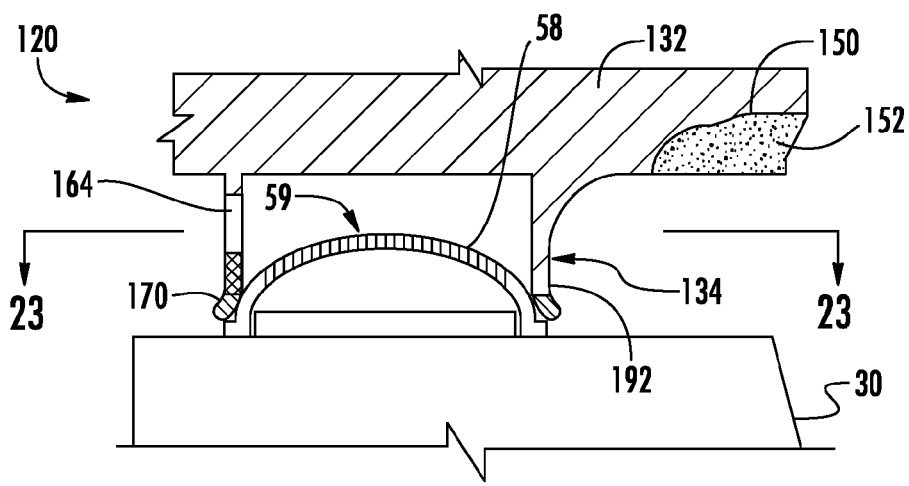
FIG. 22 is a schematic diagram of another example mower.
Figure 23:
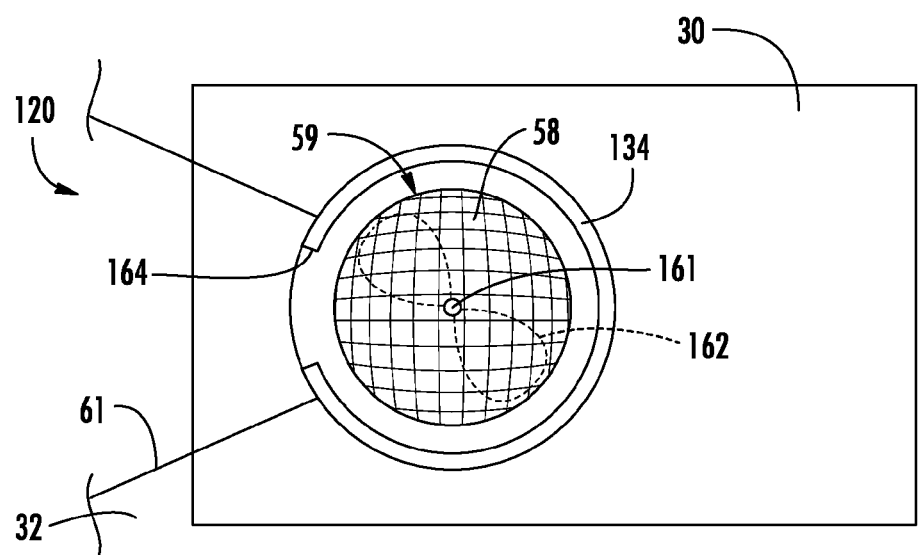
FIG. 23 is a sectional view of the mower of FIG. 22 taken along line 23-23.

FIG. 22 schematically illustrates mower 120, another example implementation of mower 20. Mower 120 is identical to mower 20 described above except that mower 120 comprises bed 132 and plenum 134 in lieu of bed 32 and plenum 34. Those remaining components of mower 120 which correspond to components of mower 20 are numbered similarly and/or are shown in FIGS. 1-21 above.

Bed 132 is identical to bed 32 described above except that bed 132 is specifically illustrated as having a hollow interior 150 at least partially filled with a sound insulating material 152, such as a sound insulating foam. As a result, bed 132 inhibits transmission of noise from engine 30. In other implementations, bed 132 may omit the material 152 and/or the hollow interior 150.

Like plenum 34, plenum 134 is carried by bed 32 so as to be moved with bed 32 when bed 32 is raised and lowered. As noted above, in the example illustrated, bed 32 pivots about an axis. In other implementations, bed 32 may be vertically raised and lowered without such pivoting. In the example illustrated, plenum 134 is integrally formed as a single unitary body as part of bed 132. For example, in one implementation, plenum 134 may be molded as a single unitary body as part of bed or with bed 132. In other implementations, plenum 134 may be welded, snapped, fastened or otherwise mounted to the underside of bed 132.

Plenum 134 comprises a downwardly extending skirt 192 that extends from the underside of bed 32. Skirt 192 is sized and shaped so as to extend about air intake 59, and in the example illustrated, about screen 58. In the example illustrated, skirt 192 extends at least 180°, and in one implementation, at least 240° about the rotational axis 161 of the fan 162 which draws cooling air through screen 58. In one implementation, skirt 192 extends at least 180°, and in one implementation, at least 240° about the air intake 59.

As shown by FIG. 22, in the example illustrated, skirt 192 extends downward into conforming contact with surfaces or structures about air intake 59. In one implementation, the lower end of skirt 192 may be provided with a flexible gasket or rubber-like ring 170 that conformally bends and flexes to seal against and about screen 58 or about air intake 59. In one implementation, skirt 192 contacts a perimeter of screen 58. In another implementation, skirt 192 contacts the upper surface of engine 30 in close proximity to the perimeter of air intake 59.

To facilitate the flow of cooling air to air intake 59, skirt 192 of plenum 134 comprises at least gas flow passage 164 in communication with the air intake opening of bed 32, such as opening 61. In one implementation, gas flow passage 164 comprises a slot or an array of slots extending through skirt 192. In another implementation, gas flow passage 164 comprises other shaped openings, such an array of openings extending through skirt 192. In one implementation, skirt 192 completely surrounds each of the openings of gas flow passage 164. In other implementations, the openings of gas flow passage 164 continuously upwardly extend from an edge or lower lip of skirt 192.

In one implementation, each of the openings of gas flow passage 164 are size, shape and dimensions to facilitate the flow of air while also blocking or inhibiting the flow of debris. For example, in one implementation, screen 58 has an array of individual openings, each opening having a first area through which air may flow, wherein the fan 162 draws air through screen 58 at a first maximum rate and wherein the openings of gas flow passage 164 each have a second area through which air may flow, wherein the second area of each opening and the total number of openings forming gas flow passage 164 facilitate airflow through skirt 192 at a second rate equal to or within 10% of the first maximum rate. In one implementation, the second area of each opening is no greater than 10% greater than the first area of each opening of screen 58 to inhibit the inflow of debris through skirt 192. In some implementations in which skirt 192 as openings size to us to filter debris, screen 58 may be omitted or may have openings having first areas greater than the second area of each of the openings of gas flow passage 164.

Figure 24:
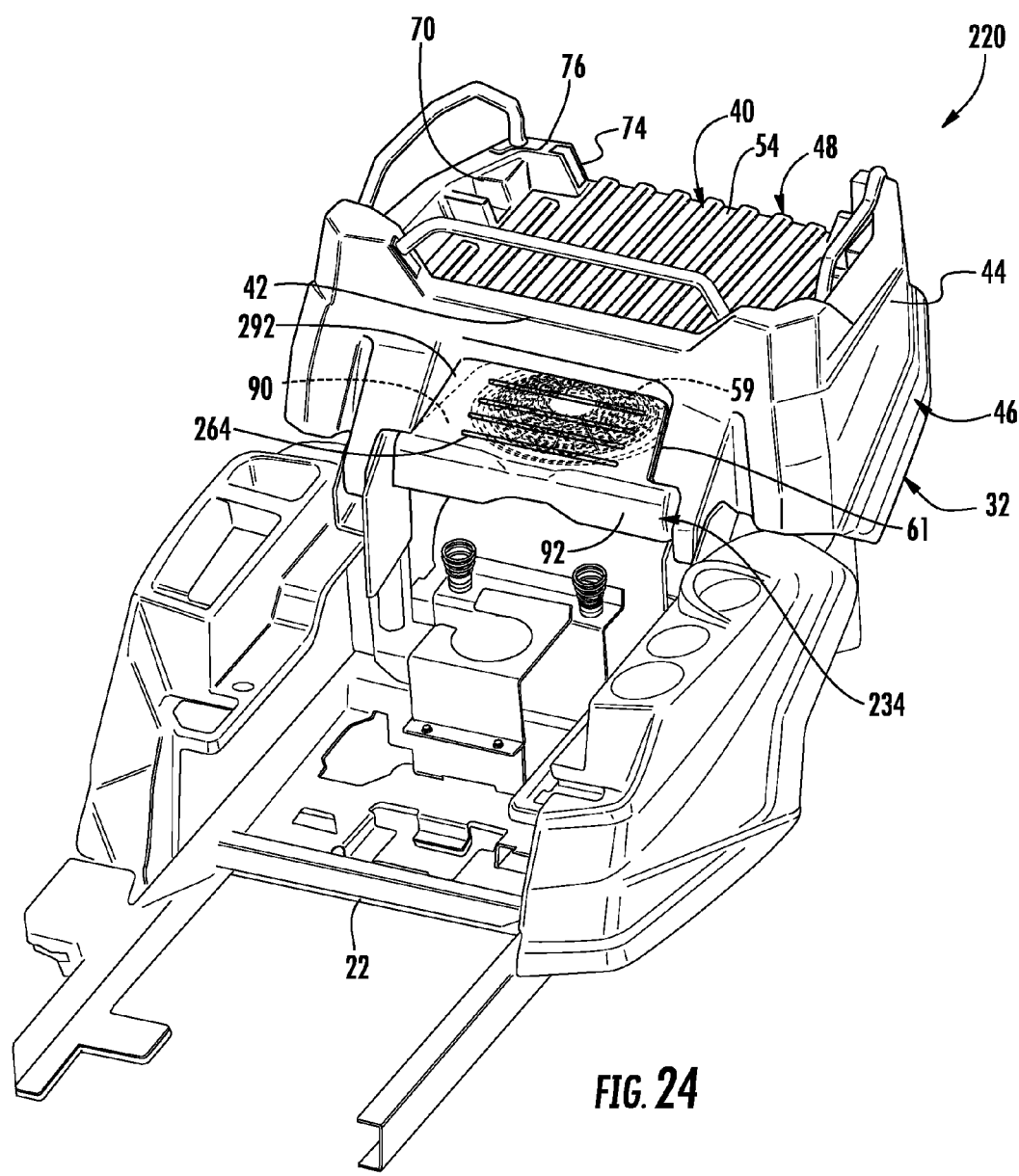
FIG. 24 is a perspective view of a portion of another example mower.

FIG. 24 illustrates mower 220, another example implementation of mower 20. Mower 120 is identical to mower 20 described above except that mower 220 comprises plenum 234 in lieu of plenum 34. Those remaining components of mower 220 which correspond to components of mower 20 are numbered similarly and/or are shown in FIGS. 1-21 above.

Plenum 234 is identical to plenum 34 described above except that Plenum 234 additionally comprises an upwardly extending skirt or panel 292 that extends across opening 61. Panel 292 comprises a plurality of gas flow passages 264, such as slots or vent openings, through which air may be drawn to air intake 59. In some implementations where gas flow passages 264 are sized to filter debris, screen 58 (described above) may be omitted.

Figure 25:
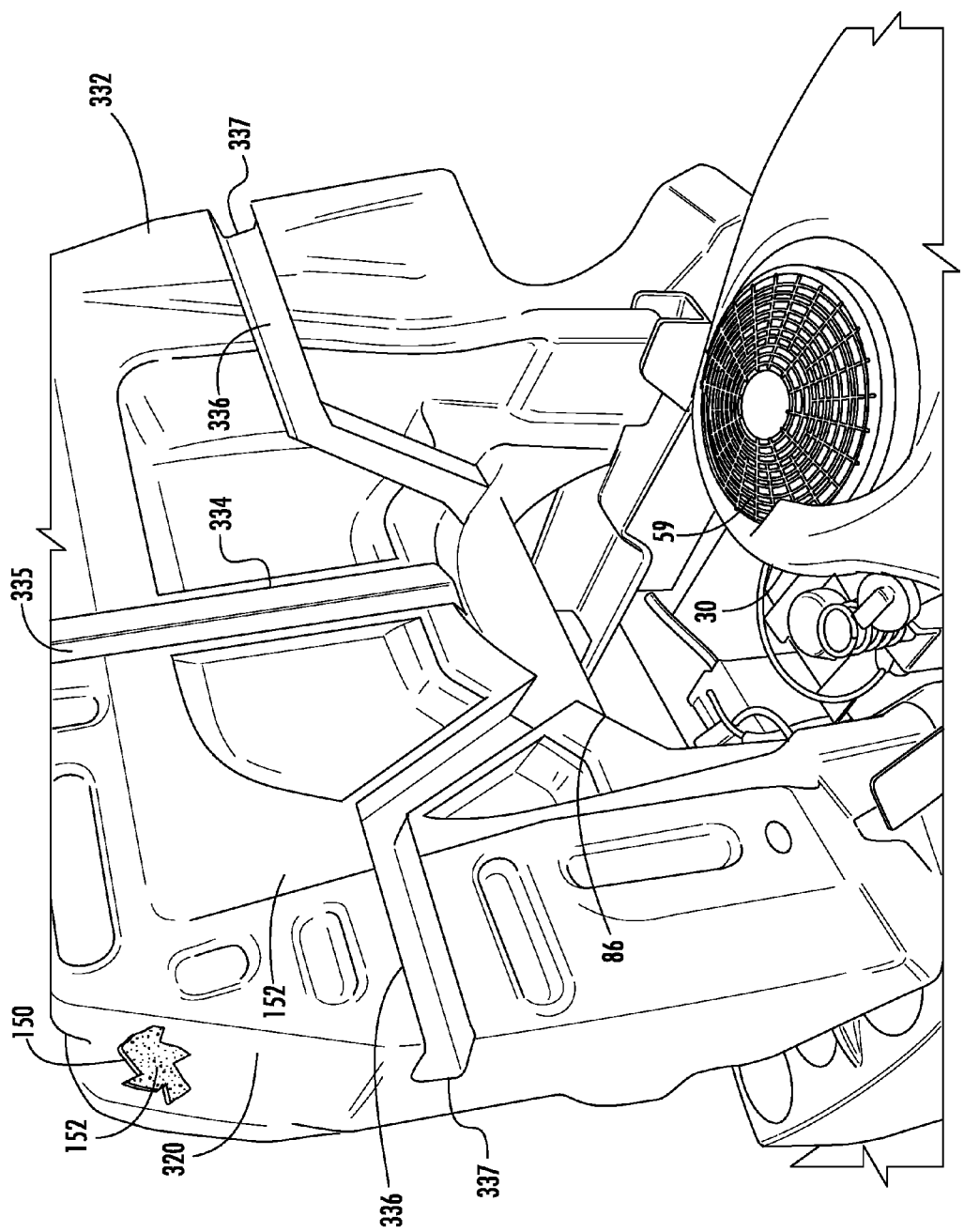
FIG. 25 is a fragmentary perspective view of a portion of another example mower, with an example bed in a raised position.

FIG. 25 illustrates mower 320, another example implementation of mower 20. Mower 320 is identical to mower 20 described above except that mower 320 comprises bed 332 in lieu of bed 32. Those remaining components of mower 320 which correspond to components of mower 20 are numbered similarly and/or are shown in FIGS. 1-21 above.

Like bed 32, bed 332 pivots about an axis. In other implementations, bed 332 may be vertically raised and lowered without such pivoting. In the example illustrated, bed 332 is substantially similar to bed 32 described above except that, similar to bed 132, bed 332 comprise a hollow interior 150 at least partially filled with a sound dampening foam 152.

As further shown by FIG. 25, bed 332 has an underside or bottom 352 which additionally provides air openings or air ducts 334, 336. Air duct 334 comprises a gas flow passage or gas flow channel extending from cavity 86 to the rear of bed 132. Air duct 334 provides a gas flow input port or opening located on the rear portion of the frame of mower 320 behind the pair of rear wheels 26 (shown in FIG. 1). Air ducts 336 comprise gas flow passages or gas flow channels extending from cavity 86 to each of the opposite sides of bed 332. Air ducts 336 terminate at mouths or openings 337 on the opposite sides of bed 332. In other implementations, duct 334 and/or ducts 336 may be omitted. In other implementations, additional air flow ducts may be provided on the underside of bed 332.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments wherein other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

What is claimed is:

1. A mower comprising:
    a frame;
    an engine supported by the frame and having an upwardly facing cooling air intake through which air is drawn to cool the engine; and
    a utility bed extending at least partially over the air intake, the bed having an imperforate floor.

2. The mower of claim 1 further comprising a plenum having a top about the air intake and a skirt extending downward from the top.

3. The mower of claim 2, wherein the air intake has an upwardly facing screen through which air is drawn through to cool the engine.

4. The mower of claim 3, wherein the skirt has a height of greater than or equal to 1.0 inches.

5. The mower of claim 3, wherein the bed is pivotably connected to the frame and wherein the plenum is carried by the bed.

6. The mower of claim 5, wherein the mower has rear wheel axles and wherein the bed is pivotably connected to the frame forward the rear wheel axles.

7. The mower of claim 6, wherein the bed is pivotable towards a front of the mower.

8. The mower of claim 7, wherein the mower comprises a seat, wherein the seat is pivotable towards the front of the mower.

9. The mower of claim 8, wherein the bed has a bottom directly above a portion of the air intake screen and spaced from the air intake screen by less than or equal to 6.0 inches.

10. The mower of claim 1, wherein the bed comprises a front wall and opposing sidewalls, the sidewalls comprising a first pair of aligned channels to receive a panel to extend across the bed.

11. The mower of claim 10, wherein the channels are spaced from the front wall by a distance of between 9 inches and 12 inches.

12. The mower of claim 10, wherein the channels are spaced from the front wall by a distance so as to form a space between the front wall and the panel received within the channels, the space being dimensioned to tightly receive an upwardly oriented 5 gallon bucket.

13. The mower of claim 10, wherein the sidewalls further comprise a second pair of aligned channels rearward of the first pair of aligned channels, the second pair of aligned channels to receive a second panel to extend across the bed.

14. The mower of claim 13, wherein the channels each have a width of at least 1.5 inches and less than or equal to 1.75 inches.

15. The mower of claim 1, wherein the bed comprises a front wall and opposing sidewalls, the sidewalls curving towards each other as the sidewalls approach a rear of the bed.

16. The mower of claim 1, wherein the mower comprises a muffler at a rear of the engine, wherein the bed projects above the muffler rearwardly of the muffler.

17. The mower of claim 1, wherein the floor comprises rearwardly directed drain flutes.

18. The mower of claim 1, wherein the mower comprises a fan below the air intake screen and wherein the bed has a front wall with an interior surface, the interior surface extending rearward of a rotational axis of the fan.

19. The mower of claim 1, wherein the floor comprises of a double walled molded polymer.

20. The mower of claim 18, wherein the floor comprises a hollow portion.

21. The mower of claim 1, further comprising a retainer to releasably retain a rear of the bed to the frame.

22. The mower of claim 20, wherein the frame comprises a first pair of sleeves, wherein the bed comprises a second pair of sleeves aligned with the first pair of sleeves and wherein the mower further comprises a pair of pins extending through the first pair of sleeves and the second pair of sleeves to pivotally secure a front end of the bed to the frame.

23. A mower comprising:
   a frame;
   an engine supported by the frame and having an upwardly facing air intake through which air is drawn to cool the engine; and
   a utility bed extending at least partially over the air intake; and
   a plenum having a top about the air intake and a skirt extending downward from the top, wherein the plenum extends from the utility bed and restricts the flow of heated air from the engine from entering the air drawn through the air intake to cool the engine.

\* \* \* \* \*